(12) United States Patent
Volkerink et al.

(10) Patent No.: US 12,475,339 B2
(45) Date of Patent: Nov. 18, 2025

(54) SYSTEM AND METHOD FOR ENHANCED ASSET TRACKING AND SECURITY FOR BORDER PROTECTION AND OTHER APPLICATIONS

(71) Applicant: Trackonomy Systems, Inc., San Jose, CA (US)

(72) Inventors: Hendrik J Volkerink, PaloAlto, CA (US); Ajay Khoche, West San Jose, CA (US)

(*) Notice: Subject to any disclaimer, the term of this patent is extended or adjusted under 35 U.S.C. 154(b) by 0 days.

(21) Appl. No.: 17/970,563

(22) Filed: Oct. 21, 2022

(65) Prior Publication Data

US 2023/0097544 A1    Mar. 30, 2023

Related U.S. Application Data

(63) Continuation-in-part of application No. 17/449,582, filed on Sep. 30, 2021, now Pat. No. 11,741,822,
(Continued)

(51) Int. Cl.
*G06K 7/10*        (2006.01)
*B66C 15/06*       (2006.01)

(52) U.S. Cl.
CPC ........ *G06K 7/10445* (2013.01); *B66C 15/065* (2013.01); *G06K 7/10405* (2013.01)

(58) Field of Classification Search
CPC .... G08B 13/00; G08B 13/06; G08B 13/1427; G08B 13/1436; G08B 13/22; G08G 13/14;
(Continued)

(56) References Cited

U.S. PATENT DOCUMENTS 4,064,552 A    12/1977   Angelucci et al.
4,974,129 A    11/1990   Grieb et al.
(Continued)

FOREIGN PATENT DOCUMENTS

AU    2018204317 A1    1/2019
AU    2018250358 A1    5/2019
(Continued)

OTHER PUBLICATIONS

NPL Seasch1 (May 9, 2024.*
(Continued)

*Primary Examiner* — Van T Trieu

(57) ABSTRACT

A system for detecting containers that have been tampered with includes one or more tamper detecting tape nodes attached to a container storing one or more assets, and a tracking system controller configured to receive data from the one or more scanning tape nodes, track the container and the one or more assets, and maintain a database comprising data on the container and the one or more assets, according to some embodiments. Each of the one or more tamper detecting tape nodes comprising a first type of wireless communication system and configured to detect tampering events that occur to the container, store tampering event data corresponding to the tampering events in a storage or memory of the tamper detecting tape node, and wireless communicate with other wireless nodes of the system.

21 Claims, 25 Drawing Sheets

Related U.S. Application Data which is a continuation-in-part of application No. 17/330,353, filed on May 25, 2021, now Pat. No. 11,663,889.

(60) Provisional application No. 63/257,987, filed on Oct. 20, 2021, provisional application No. 63/196,150, filed on Jun. 2, 2021, provisional application No. 63/124,791, filed on Dec. 12, 2020, provisional application No. 63/029,675, filed on May 25, 2020, provisional application No. 63/085,992, filed on Sep. 30, 2020.

(58) Field of Classification Search
CPC ............ G08G 1/123; G08G 1/20; G06K 7/00; G06K 7/10; G06K 19/06; G06Q 10/00; G06Q 10/08; G06Q 10/10; G06Q 30/00
See application file for complete search history.

(56) References Cited

U.S. PATENT DOCUMENTS

| | | | |
|---|---|---|---|
| 5,917,433 | A | 6/1999 | Keillor et al. |
| 6,437,702 | B1 | 8/2002 | Ragland |
| 6,522,874 | B1 | 2/2003 | Chu et al. |
| 6,919,803 | B2 | 7/2005 | Breed |
| 7,009,517 | B2 | 3/2006 | Wood |
| 7,866,555 | B2 | 1/2011 | Schmid et al. |
| 8,095,070 | B2 | 1/2012 | Twitchell, Jr. |
| 8,542,099 | B2 | 9/2013 | Pizzuto |
| 9,228,911 | B1 | 1/2016 | Meyers |
| 9,886,799 | B2 | 2/2018 | Kwak |
| 10,650,657 | B1 | 5/2020 | Curran |
| 10,758,943 | B1 | 9/2020 | Carpenter |
| 10,902,240 | B2 | 1/2021 | Adato et al. |
| 11,115,732 | B2 | 9/2021 | Lucrecio et al. |
| 2002/0089434 | A1 | 7/2002 | Ghazarian |
| 2003/0089771 | A1 | 5/2003 | Cybulski et al. |
| 2003/0173408 | A1 | 9/2003 | Mosher et al. |
| 2004/0066274 | A1 | 4/2004 | Bailey |
| 2004/0224640 | A1 | 11/2004 | MacFarland |
| 2006/0055552 | A1 | 3/2006 | Chung et al. |
| 2006/0187033 | A1 | 8/2006 | Hall et al. |
| 2007/0085677 | A1 | 4/2007 | Neff et al. |
| 2007/0095905 | A1 | 5/2007 | Kadaba |
| 2007/0164858 | A1 | 7/2007 | Webb |
| 2007/0164863 | A1 | 7/2007 | Himberger et al. |
| 2008/0111693 | A1* | 5/2008 | Johnson .................. G01S 13/74 340/572.1 |
| 2008/0151801 | A1 | 6/2008 | Mizuta |
| 2008/0252084 | A1 | 10/2008 | Francis et al. |
| 2009/0322510 | A1 | 12/2009 | Beger et al. |
| 2010/0210322 | A1 | 8/2010 | Kim et al. |
| 2011/0127325 | A1 | 6/2011 | Hussey et al. |
| 2012/0075343 | A1 | 3/2012 | Chen et al. |
| 2013/0002443 | A1 | 1/2013 | Breed et al. |
| 2013/0033381 | A1* | 2/2013 | Breed ................ G08B 13/2417 340/568.1 |
| 2013/0146122 | A1 | 6/2013 | Chung |
| 2013/0211976 | A1 | 8/2013 | Breed |
| 2014/0062699 | A1 | 3/2014 | Heine et al. |
| 2014/0159869 | A1 | 6/2014 | Zumsteg et al. |
| 2014/0163430 | A1 | 6/2014 | Tropper et al. |
| 2014/0250745 | A1 | 9/2014 | Foltz |
| 2015/0227245 | A1 | 8/2015 | Inagaki et al. |
| 2015/0310773 | A1 | 10/2015 | Cho et al. |
| 2015/0312653 | A1 | 10/2015 | Avrahami et al. |
| 2015/0366518 | A1 | 12/2015 | Sampson |
| 2017/0078950 | A1 | 3/2017 | Hillary et al. |
| 2017/0103635 | A1 | 4/2017 | Kroll et al. |
| 2018/0012472 | A1 | 1/2018 | Purcell |
| 2018/0165568 | A1 | 6/2018 | Khoche |
| 2018/0215117 | A1 | 8/2018 | De Boer et al. |
| 2018/0374039 | A1 | 12/2018 | Walden et al. |
| 2019/0012936 | A1 | 1/2019 | Yazdi et al. |
| 2019/0037362 | A1 | 1/2019 | Nogueira-Nine |
| 2019/0236531 | A1 | 8/2019 | Adato |
| 2019/0244340 | A1 | 8/2019 | Perron et al. |
| 2019/0370624 | A1 | 12/2019 | Khoche |
| 2020/0104790 | A1 | 4/2020 | Chung |
| 2020/0151655 | A1 | 5/2020 | Khoche |
| 2020/0223066 | A1 | 7/2020 | Diankov et al. |
| 2020/0285726 | A1 | 9/2020 | Kalous |
| 2020/0334514 | A1 | 10/2020 | Chen |
| 2020/0405223 | A1 | 12/2020 | Mai et al. |
| 2021/0090093 | A1* | 3/2021 | Largoza ........... G06K 19/06037 |
| 2021/0304173 | A1 | 9/2021 | Rodriguez et al. |
| 2021/0312787 | A1 | 10/2021 | Brown |
| 2021/0366251 | A1 | 11/2021 | Volkerink et al. |
| 2022/0097907 | A1 | 3/2022 | Neeld |
| 2022/0122436 | A1 | 4/2022 | Volkerink et al. |
| 2022/0300892 | A1 | 9/2022 | Volkerink et al. |
| 2022/0309899 | A1 | 9/2022 | Volkerink et al. |
| 2023/0097544 | A1 | 3/2023 | Volkerink et al. |
| 2023/0343202 | A1 | 10/2023 | Krejcarek |
| 2023/0401940 | A1 | 12/2023 | Volkerink et al. |

FOREIGN PATENT DOCUMENTS

| | | |
|---|---|---|
| AU | 2019308300 A1 | 3/2021 |
| CA | 3061878 A1 | 11/2018 |
| CA | 3008512 A1 | 12/2018 |
| DE | 60006420 T2 | 12/2003 |
| EP | 0007248 A2 | 1/1980 |
| KR | 20160103073 A | 8/2016 |
| WO | 2014137915 A1 | 9/2014 |
| WO | WO 2014153418 A1 | 9/2014 |
| WO | WO 2018053309 A1 | 3/2018 |
| WO | WO 2021/086248 A1 | 5/2021 |

OTHER PUBLICATIONS

NPL Search2 (May 9, 2024).*
International Patent Application No. PCT/US2022/013729 International Search Report and Written Opinion dated Jun. 6, 2022, 11 pages.
International Patent Application No. PCT/US2022/015161 International Search Report and Written Opinion dated Jul. 1, 2022, 15 pages.
U.S. Appl. No. 16/776,804, Final Office Action dated Feb. 3, 2022, 20 pages.
International Patent Application No. PCT/US2021/053028 International Search Report and Written Opinion dated Jan. 12, 2022, 11 pages.
International Patent Application No. PCT/US2021/034112, International Search Report and Written Opinion dated Oct. 22, 2021, 14 pages.
Nisarga et al. "System-Level Tamper Protection Using MSP MCUs." Texas Instruments, Aug. 2016, 13 pages.
Sanchez et al. Machine Learning on Difference Image Analysis: A comparison of Methods for Transient Detection.
PCT Application No. PCT/US2020/014521 International Preliminary Report on Patentability, dated Jul. 27, 2021, 6 pages.
U.S. Appl. No. 16/776,804, Non-Final Office Action dated Jul. 15, 2021, 9 pages.
U.S. Appl. No. 16/517,508, Non-Final Office Action dated Jan. 7, 2021, 10 pages.
U.S. Appl. No. 16/517,508, Non-Final Office Action dated May 6, 2020, 35 pages.
U.S. Appl. No. 17/449,582 Non-Final Office Action dated Sep. 9, 2022, 16 pages.
International Patent Application No. PCT/US2022/47338 International Search Report and Written Opinion dated Apr. 7, 2023, 15 pages.
International Search Report and Written Opinion for PCT/US2021/063120 dated Mar. 2, 2022, 13 pages.
Non Final Office Action for U.S. Appl. No. 17/330,353, mailed Jul. 28, 2022, 19 pages.
Non Final Office Action for U.S. Appl. No. 17/592,497, mailed Jul. 6, 2023, 7 pages.

(56) References Cited

OTHER PUBLICATIONS

Non Final Office Action for U.S. Appl. No. 17/648,917, mailed Feb. 2, 2023, 8 pages.
Non Final Office Action for U.S. Appl. No. 18/216,573, dated Jun. 14, 2024, 7 pages.
Non Final Office Action for U.S. Appl. No. 18/371,746, mailed Jul. 17, 2024, 6 pages.
Notice of Allowance for U.S. Appl. No. 16/776,804, mailed Jun. 23, 2022, 10 pages.
Notice of Allowance for U.S. Appl. No. 17/648,917, mailed Jun. 22, 2023, 6 pages.
NPL Search (Feb. 21, 2024), 2 pages.
NPL Search (Jun. 4, 2024), 2 pages.
NPL Search (Jul. 28, 2022), 2 pages.
NPL Search (Sep. 9, 2022), 2 pages.
Final Office Action for U.S. Appl. No. 18/216,573, dated Jan. 21, 2025, 13 pages.
Supplementary European Search Report for EP Patent Application No. 22884504.6 dated Jun. 26, 2025, 9 pages.

* cited by examiner

SYSTEM AND METHOD FOR ENHANCED ASSET TRACKING AND SECURITY FOR BORDER PROTECTION AND OTHER APPLICATIONS

RELATED APPLICATIONS

This application claims priority to pending U.S. Provisional Patent Application No. 63/257,987, filed on Oct. 20, 2021. This application is also a continuation-in-part of pending U.S. patent application Ser. No. 17/449,582, filed on Sep. 30, 2021, which claims priority to U.S. Provisional Patent Application No. 63/196,150, filed on Jun. 2, 2021, and U.S. Provisional Patent Application No. 63/124,791, filed on Dec. 12, 2020. U.S. patent application Ser. No. 17/449,582 is itself a continuation-in-part of pending U.S. patent application Ser. No. 17/330,353, filed May 25, 2021, which claims priority to U.S. Provisional patent application No. 63/085,992, filed on Sep. 30, 2020, and U.S. Provisional Patent Application No. 63/029,675, filed May 25, 2020. All of the above-referenced patent applications are incorporated herein in their entirety.

FIELD OF THE DISCLOSURE

This disclosure generally relates to wireless internet of things (IOT) devices and, in particular, to tracking devices for asset tracking and security.

BACKGROUND

Tampering in assets and containers transported in boats and vehicles is difficult to detect and track using conventional methods and systems. Often times, assets may be transported across or through borders, checkpoints, and other high security areas. It is beneficial for the security personnel at these areas to be able to quickly and efficiently detect assets that have been tampered with so that they can be inspected and, in some cases, confiscated or denied entry.

SUMMARY

Disclosed herein are methods, systems, and apparatuses for enhanced border security, tamper detection, and tracking of containers and assets passing through checkpoints.

A method for detecting tampering whether tampering has occurred in a container being moved by a crane includes wirelessly communicating, by a first scanning tape node attached to a lifting apparatus of a crane, with a tamper detecting tape node on the container while the crane is moving the container, according to some embodiments. The wireless communication between the scanning tape node and the tamper detecting tape node is performed using a first type of wireless communication system. The first scanning tape node receives identifier data from the tamper detecting tape node, the identifier data comprising one or more identifiers of the tamper detecting tape node. The first scanning tape node also receives tampering event data from the tamper detecting tape node, the tampering event data corresponding to tampering events that have been detected by the tamper detecting tape or a lack of detected tampering events. The first scanning tape node transmits, by the scanning tape node, location data corresponding to a location where the container has been moved to by the crane, the received identifier data, and the received tampering event data to a wireless node of an associated tracking using a second type of wireless communication system. The tracking system then logs the received identifier data, the location, and the received tampering event data in a database.

A system for detecting containers that have been tampered with includes one or more tamper detecting tape nodes attached to a container storing one or more assets, and a tracking system controller configured to receive data from the one or more scanning tape nodes, track the container and the one or more assets, and maintain a database comprising data on the container and the one or more assets, according to some embodiments. Each of the one or more tamper detecting tape nodes comprising a first type of wireless communication system and configured to detect tampering events that occur to the container, store tampering event data corresponding to the tampering events in a storage or memory of the tamper detecting tape node, and wireless communicate with other wireless nodes of the system. Each scanning tape node comprising the first type of wireless communication system and configured to communicate with the one or more tamper detecting tape nodes when the lifting apparatus is within a first range of the container, the first range corresponding to a communication range of the first type of wireless communication system. The one or more scanning tape nodes receive tampering event data and identifier data from the one or more tamper detecting tape nodes, and a first scanning tape node of the one or more scanning tape nodes transmits the received tampering event data and the identifier data to the tracking system controller using a second type of wireless communication system.

A method for extending the battery life of a plurality of tape nodes includes assigning, a local master node role, to a first tape node of a plurality of tape nodes. A local secondary node is assigned to other tape nodes of the plurality of tape nodes. The first tape node operates, according to the local master node role. Later, responsive to the first tape node having a battery level lower than or equal to a first threshold level, local secondary node role is reassigned to the first tape node. Responsive to a second tape node of the first plurality of tape nodes having a highest battery level among the plurality of tape nodes, the local master node role is reassigned to the second tape node. Afterwards, the first tape node operates according to the local master node role, and the second tape node operates according to the secondary node role.

DETAILED DESCRIPTION

Figure 1A:
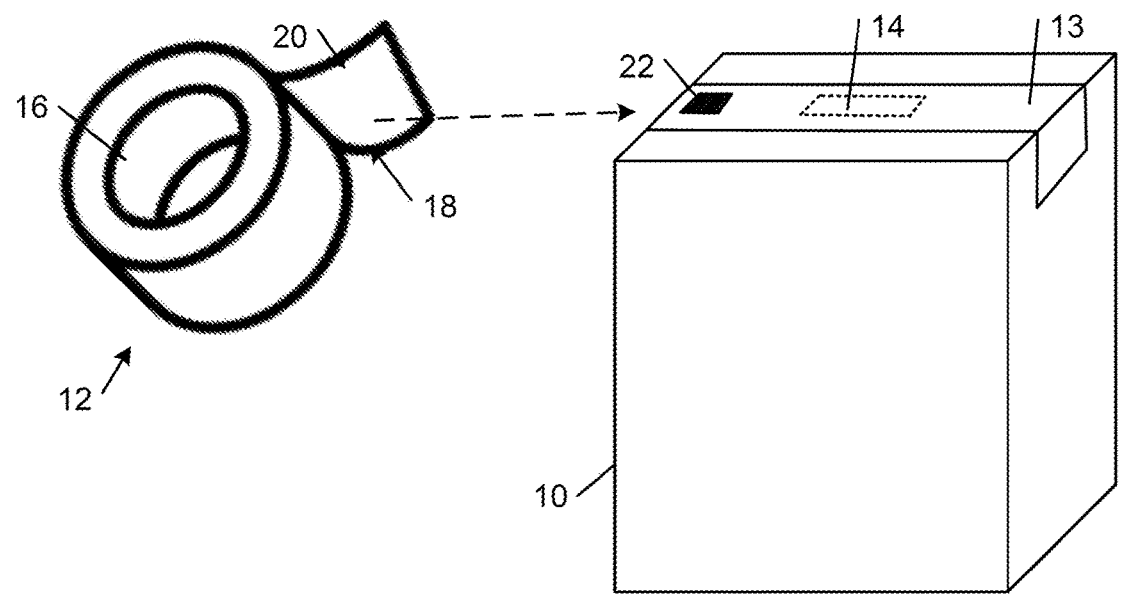
FIG. 1A is a diagrammatic view of an asset that has been sealed for shipment using a segment of an example adhesive tape platform dispensed from a roll, according to some embodiments.

While the methods, systems, and apparatuses disclosed herein are discussed in the context of border security and seaport security, the disclosed embodiments are not limited thereto. The disclosed methods, system, and apparatuses may be used in other contexts and for any applications where tamper detection, enhanced security, improved contextual scanning of assets is desirable, and extended operational lifetime is desirable.

At security checkpoints and borders where assets need to pass through, such as ports of entry, shipping yards, or other security checkpoints, it is desirable to quickly and efficiently determine if an asset or a container for assets needs to be inspected or fails conditions for passage through the checkpoint. Conditions for an asset necessitating an inspection or failing to meet conditions to pass through the checkpoint without intervention may include: tampering that may occur during a voyage for the asset or a container containing assets, a container or asset being flagged for deferred inspections, in which a container or asset which enters a port has its inspection deferred to a later time or deferred to a secondary inspection location, and a container or asset being flagged for rejection or blacklisted, in which an asset has been inspected previously and rejected at the time of inspection.

Tampering may occur to avoid the detection of the above conditions at a security or border checkpoint. For example, in cases where an inspected item (e.g., a perishable good) is rejected for entry into a border protection checkpoint or port, a bad actor may remove the rejected item and place it in another container. The other container may not have been inspected yet. The bad actor may then attempt to smuggle the rejected item in the other container, which may make it through border protection if the rejected item is not caught or is not inspected while in the other container.

A tracking system and method, disclosed herein, aids in the detection of the following: containers that have been tampered with during a voyage, containers that have been flagged for deferred inspection, detection of tampering with said containers in an interim period after the container has first been flagged for deferred inspection, and containers holding rejected shipments or assets, detection of containers storing assets that are rejected or were flagged for deferred inspection.

The tracking system includes the use of wireless IOT devices. In some embodiments, one or more of the wireless IOT devices is an adhesive tape platform or a segment thereof. The adhesive tape platform includes wireless transducing components and circuitry that perform communication and/or sensing. The adhesive tape platform has a flexible adhesive tape form-factor that allows it to function as both an adhesive tape for adhering to and/or sealing objects and a wireless sensing device.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

As used herein, the term "or" refers to an inclusive "or" rather than an exclusive "or." In addition, the articles "a" and "an" as used in the specification and claims mean "one or more" unless specified otherwise or clear from the context to refer the singular form.

The term "tape node" refers to an adhesive tape platform or a segment thereof that is equipped with sensor, processor, memory, energy source/harvesting mechanism, and wireless communications functionality, where the adhesive tape platform (also referred to herein as an "adhesive product" or an "adhesive tape product") has a variety of different form factors, including a multilayer roll or a sheet that includes a plurality of divisible adhesive segments. Once deployed, each tape node can function, for example, as an adhesive tape, label, sticker, decal, or the like, and as a wireless communications device.

The terms "adhesive tape node," "wireless node," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or "peripheral" wireless node, also referred to as an outer node, leaf node, or terminal node, refers to a node that does not have any child nodes.

In some instances, a "wireless node" may refer to a node or wireless device of the wireless tracking system that is not an adhesive tape platform. For example, a wireless node, in some embodiments, may have a form factor that is not flexible or may not include an adhesive.

In certain contexts, the terms "parcel," "envelope," "box," "package," "container," "pallet," "carton," "wrapping," and the like are used interchangeably herein to refer to a packaged item or items.

In certain contexts, the terms "wireless tracking system," "hierarchical communications network," "distributed agent operating system," and the like are used interchangeably herein to refer to a system or network of wireless nodes.

INTRODUCTION

This specification describes a low-cost, multi-function adhesive tape platform with a form factor that unobtrusively integrates the components useful for implementing a combination of different asset tracking and management functions and also is able to perform a useful ancillary function that otherwise would have to be performed with the attendant need for additional materials, labor, and expense. In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various asset management and tracking applications and workflows, including person and object tracking applications, and asset management workflows such as manufacturing, storage, shipping, delivery, and other logistics associated with moving products and other physical objects, including logistics, sensing, tracking, locationing, warehousing, parking, safety, construction, event detection, road management and infrastructure, security, and healthcare. In some examples, the adhesive tape platforms are used in various aspects of asset management, including sealing assets, transporting assets, tracking assets, monitoring the conditions of assets, inventorying assets, and verifying asset security. In these examples, the assets typically are transported from one location to another by truck, train, ship, or aircraft or within premises, e.g., warehouses by forklift, trolleys etc.

In disclosed examples, an adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications based network communications and transducing (e.g., sensing, actuating, etc.) applications. Examples of such applications include: event detection applications, monitoring applications, security applications, notification applications, and tracking applications, including inventory tracking, asset tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and locationing functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other asset tracking and management applications across heterogeneous environments.

Adhesive Tape Platform

FIG. 1A shows an example asset 10 that is sealed for shipment using an example adhesive tape platform 12 that includes embedded components of a wireless transducing circuit 14 (collectively referred to herein as a "tape node"). In this example, a length 13 of the adhesive tape platform 12 is dispensed from a roll 16 and affixed to the asset 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the asset 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers).

Figure 1B:
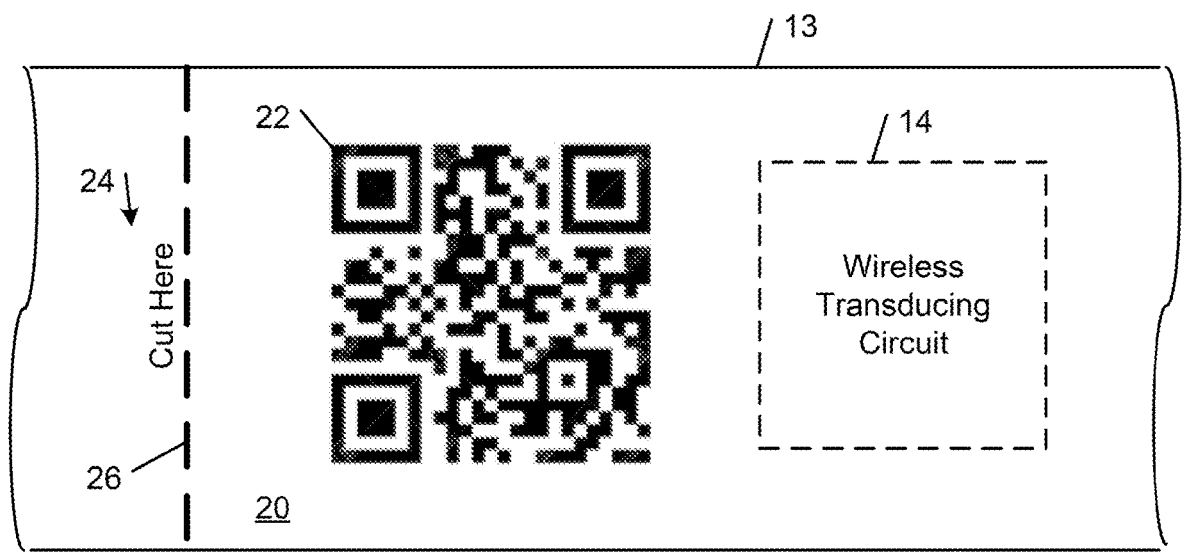
FIG. 1B is a diagrammatic top view of a portion of the segment of the example adhesive tape platform shown in FIG. 1A, according to some embodiments.

Referring to FIG. 1B, in some examples, the non-adhesive side 20 of the length 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the length 13 of the adhesive tape platform 12 includes a two-dimensional bar code (e.g., a QR Code) 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive product 12 or, alternatively, may be marked on the non-adhesive surface 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any active components of the wireless transducing circuit 14. The spacing between the wireless transducing circuit components 14 and the cut lines 26 may vary depending on the intended communication, transducing and/or adhesive taping application. In the example illustrated in FIG. 1A, the length of the adhesive tape platform 12 that is dispensed to seal the asset 10 corresponds to a single segment of the adhesive tape platform 12. In other examples, the length of the adhesive tape platform 12 needed to seal a asset or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or applying the length of the adhesive tape platform to the asset 10.

In some examples, the transducing components 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 14 in one or more segments of the adhesive tape platform 12 in response to being separated from the adhesive tape platform 12 (e.g., along the cut line 26).

In some examples, each segment 13 of the adhesive tape platform 12 includes its own respective energy source including energy harvesting elements that can harvest energy from the environment. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the transducing components 14 in all of the segments 13 in the given length of the adhesive tape platform 12. In some of these examples, the energy sources are connected in parallel and concurrently activated to power the transducing components 14 in all of the segments 13 at the same time.

In other examples, the energy sources are connected in parallel and alternately activated to power the transducing components 14 in respective ones of the adhesive tape platform segments 13 at different time periods, which may or may not overlap.

Figure 2:
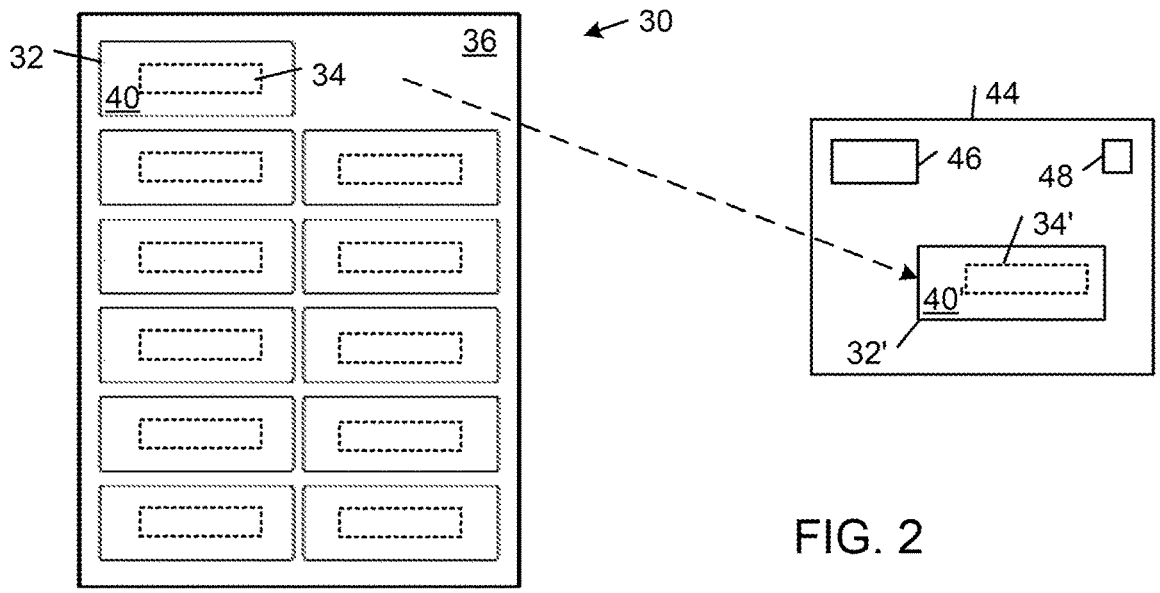
FIG. 2 is a diagrammatic view of an example of an envelope carrying a segment of an example adhesive tape platform dispensed from a backing sheet, according to some embodiments.

FIG. 2 shows an example adhesive tape platform 30 that includes a set of adhesive tape platform segments 32 each of which includes a respective set of embedded wireless transducing circuit components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, segments of the adhesive tape platform 12 are deployed by a human operator. The human operator may be equipped with a mobile phone or other device that allows the operator to authenticate and initialize the adhesive tape platform 12. In addition, the operator can take a picture of a asset including the adhesive tape platform and any barcodes associated with the asset and, thereby, create a persistent record that links the adhesive tape platform 12 to the asset. In addition, the human operator typically will send the picture to a network service and/or transmit the picture to the adhesive tape platform 12 for storage in a memory component of the adhesive tape platform 12.

In some examples, the wireless transducing circuit components 34 that are embedded in a segment 32 of the adhesive tape platform 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 34 in the segment 32 in response to the detection of a change in capacitance between the segment 32 and the backing sheet 36 as a result of removing the segment 32 from the backing sheet 36.

Figure 3:
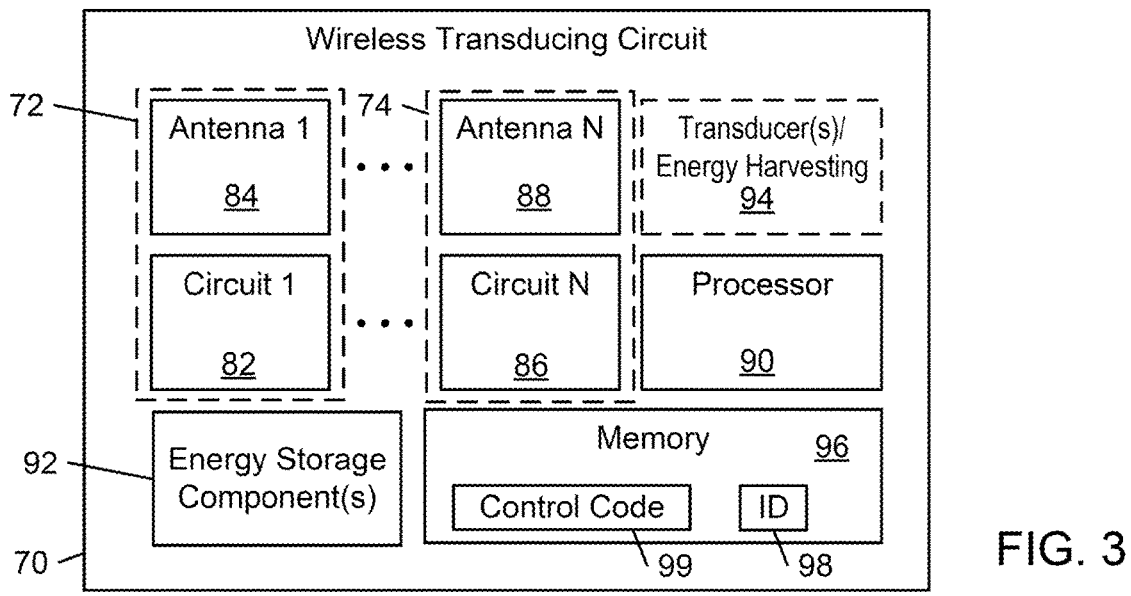
FIG. 3 is a schematic view of an example segment of an adhesive tape platform, according to some embodiments.

FIG. 3 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage devices 92 (e.g., non-rechargeable or rechargeable printed flexible battery, conventional single or multiple cell battery, and/or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data, including, e.g., profile data, state data, event data, sensor data, localization data, security data, and one or more unique identifiers (ID) 98 associated with the wireless transducing circuit 70, such as a product ID, a type ID, and a media access control (MAC) ID, and control code 99. In some examples, the memory 96 may be incorporated into one or more of the processor 90 or transducers 94, or may be a separate component that is integrated in the wireless transducing circuit 70 as shown in FIG. 3. The control code typically is implemented as programmatic functions or program modules that control the operation of the wireless transducing circuit 70, including a tape node communication manager that manages the manner and timing of tape node communications, a tape node power manager that manages power consumption, and a tape node connection manager that controls whether connections with other tape nodes are secure connections or unsecure connections, and a tape node storage manager that securely manages the local data storage on the node. The tape node connection manager ensures the level of security required by the end application and supports various encryption mechanisms. The tape node power manager and tape communication manager work together to optimize the battery consumption for data communication. In some examples, execution of the control code by the different types of tape nodes described herein may result in the performance of similar or different functions.

Figure 4:
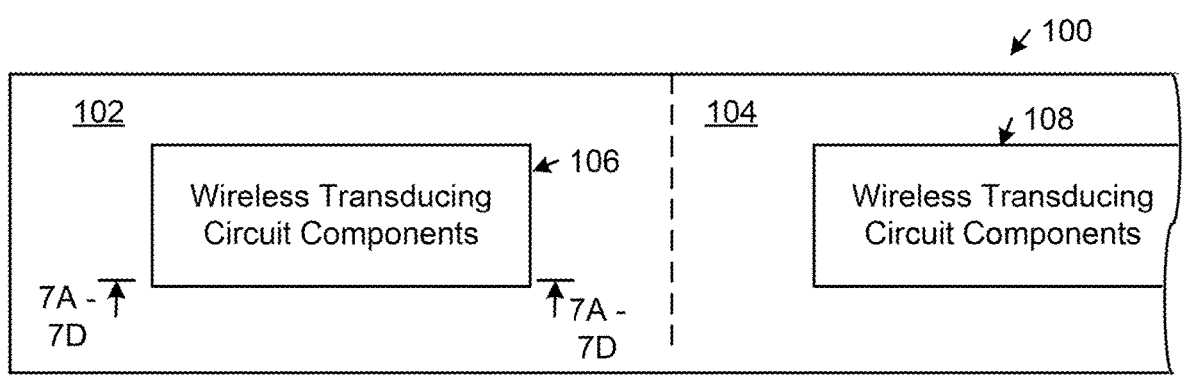
FIG. 4 is a diagrammatic top view of a length of an example adhesive tape platform, according to some embodiments.

FIG. 4 is a top view of a portion of an example flexible adhesive tape platform 100 that shows a first segment 102 and a portion of a second segment 104. Each segment 102, 104 of the flexible adhesive tape platform 100 includes a respective set 106, 108 of the components of the wireless transducing circuit 70. The segments 102, 104 and their respective sets of components 106, 108 typically are identical and configured in the same way. In some other embodiments, however, the segments 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 100 (see FIG. 4) according to a roll-to-roll fabrication process is described in connection with FIGS. 6, 7A, and 7B of U.S. Pat. No. 10,262,255, issued Apr. 16, 2019, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 5A:
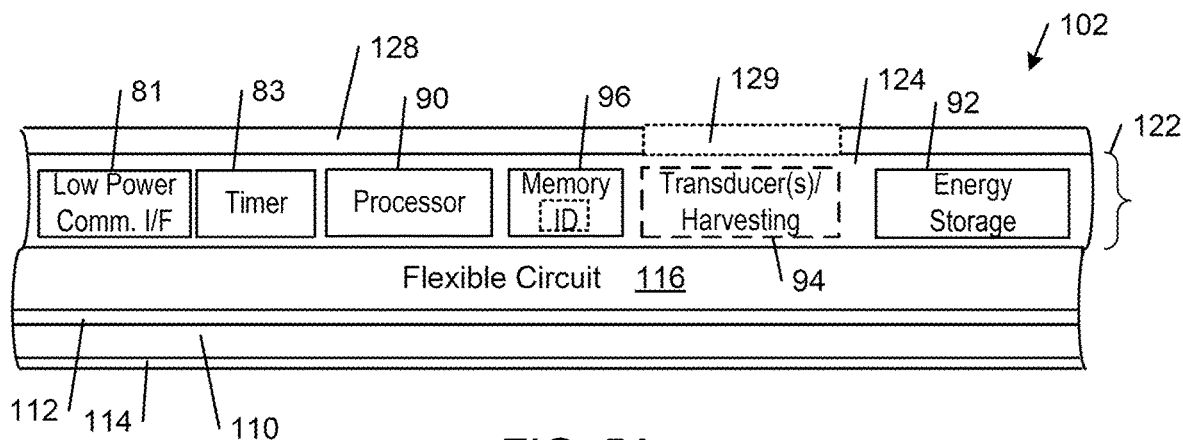
FIGS. 5A-5C show diagrammatic cross-sectional side views of portions of different respective adhesive tape platforms, according to some embodiments.

FIG. 5A shows a cross-sectional side view of a portion of an example segment 102 of the flexible adhesive tape platform 100 that includes a respective set of the components of the wireless transducing circuit 106 corresponding to the first tape node type (i.e., white). The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, a low power wireless communication interface 81 (e.g., a Zigbee, Bluetooth® Low Energy (BLE) interface, or other low power communication interface), a timer circuit 83, transducing and/or energy harvesting component(s) 94 (if present), the memory 96, and other components in a device layer 122 to each other and to the energy storage component 92 and, thereby, enable the transducing, tracking and other functionalities of the flexible adhesive tape platform segment 102. The low power wireless communication interface 81 typically includes one or more of the antennas 84, 88 and one or more of the wireless circuits 82, 86.

Figure 5B:
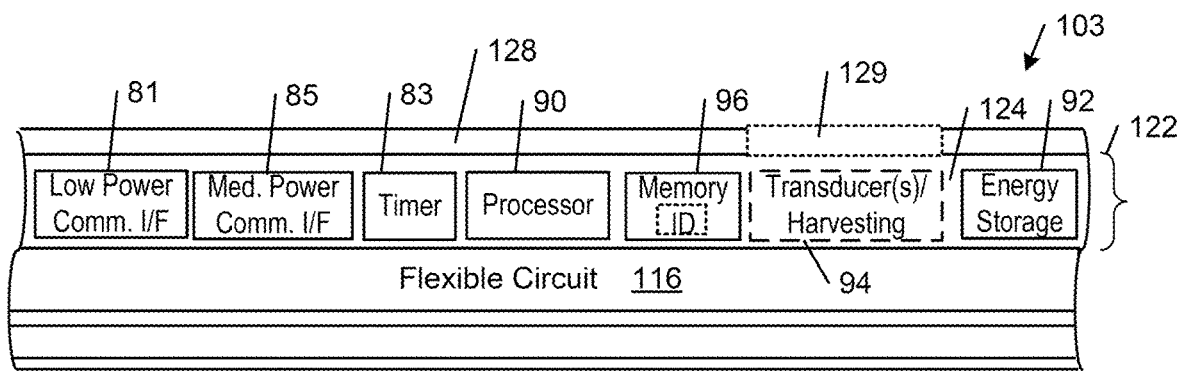

FIG. 5B shows a cross-sectional side view of a portion of an example segment 103 of the flexible adhesive tape platform 100 that includes a respective set of the components of the wireless transducing circuit 106 corresponding to the second tape node type (i.e., green). In this example, the flexible adhesive tape platform segment 103 differs from the segment 102 shown in FIG. 5A by the inclusion of a medium power communication interface 85 (e.g., a LoRa interface) in addition to the low power communications interface that is present in the first tape node type (i.e., white). The medium power communication interface has longer communication range than the low power communication interface. In some examples, one or more other components of the flexible adhesive tape platform segment 103 differ, for example, in functionality or capacity (e.g., larger energy source).

Figure 5C:
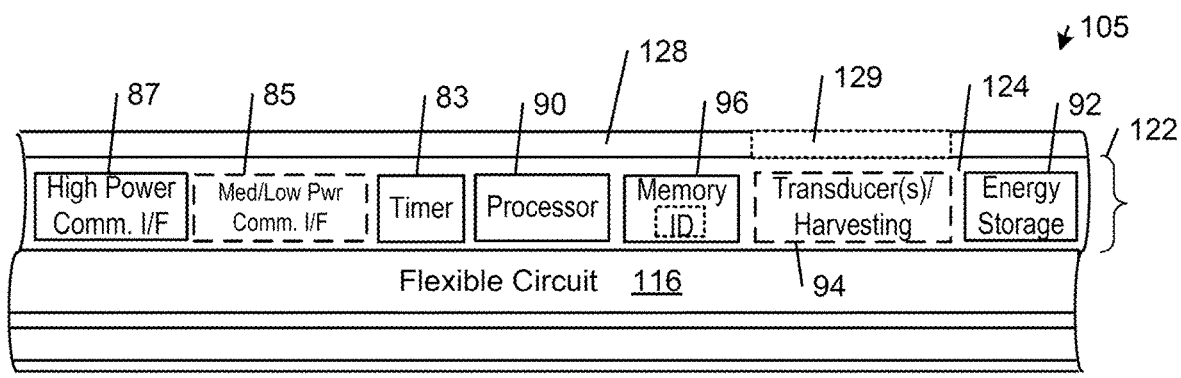

FIG. 5C shows a cross-sectional side view of a portion of an example segment 105 of the flexible adhesive tape platform 100 that includes a respective set of the components of the wireless transducing circuit 106 corresponding to the third tape node type (i.e., black). In this example, the flexible adhesive tape platform segment 105 includes a high power communications interface 87 (e.g., a cellular interface; e.g., GSM/GPRS) and an optional medium and/or low power communications interface 85. The high power communication range provides global coverage to available infrastructure (e.g. the cellular network). In some examples, one or more other components of the flexible adhesive tape platform segment 105 differ, for example, in functionality or capacity (e.g., larger energy source).

FIGS. 5A-5C show examples in which the cover layer 128 of the flexible adhesive tape platform 100 includes one or more interfacial regions 129 positioned over one or more of the transducers 94. In examples, one or more of the interfacial regions 129 have features, properties, compositions, dimensions, and/or characteristics that are designed to improve the operating performance of the platform 100 for specific applications. In some examples, the flexible adhesive tape platform 100 includes multiple interfacial regions 129 over respective transducers 94, which may be the same or different depending on the target applications. Example interfacial regions include an opening, an optically transparent window, and/or a membrane located in the interfacial region 129 of the cover 128 that is positioned over the one or more transducers and/or energy harvesting components 94. Additional details regarding the structure and operation of example interfacial regions 129 are described in U.S. Provisional Patent Application No. 62/680,716, filed Jun. 5, 2018, PCT Patent Application No. PCT/US2018/064919, filed Dec. 11, 2018, U.S. Pat. No. 10,885,420, issued Jan. 4, 2021, U.S. Pat. No. 10,902,310 issued Jan. 25, 2021, and U.S. Provisional Patent Application No. 62/670,712, filed May 11, 2018, all of which are incorporated herein in their entirety.

In some examples, a flexible polymer layer 124 encapsulates the device layer 122 and thereby reduces the risk of damage that may result from the intrusion of contaminants and/or liquids (e.g., water) into the device layer 122. The flexible polymer layer 124 also planarizes the device layer 122. This facilitates optional stacking of additional layers on the device layer 122 and also distributes forces generated in, on, or across the adhesive tape platform segment 102 so as to reduce potentially damaging asymmetric stresses that might be caused by the application of bending, torqueing, pressing, or other forces that may be applied to the flexible adhesive tape platform segment 102 during use. In the illustrated example, a flexible cover 128 is bonded to the planarizing polymer 124 by an adhesive layer (not shown).

The flexible cover 128 and the flexible substrate 110 may have the same or different compositions depending on the intended application. In some examples, one or both of the flexible cover 128 and the flexible substrate 110 include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, the adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 124 is composed of a flexible epoxy (e.g., silicone).

In some examples, the energy storage device 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments 102 shown in FIGS. 5A-5C, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the low power communications interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the transducers) on the front-side of the flexible circuit 116 to the electrodes of the flexible battery 116 via one or more through holes in the substrate of the flexible circuit 116.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some examples, a set of multiple flexible adhesive tape platforms 100 are provided that include different respective sampling densities in order to seal different asset sizes with a desired number of wireless transducing circuits 70. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 70. In some example applications (e.g., shipping low value goods), only one wireless transducing circuit 70 is used per asset, whereas in other applications (e.g., shipping high value goods) multiple wireless transducing circuits 70 are used per asset. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of adhesive tape platforms 100.

Figure 6A:
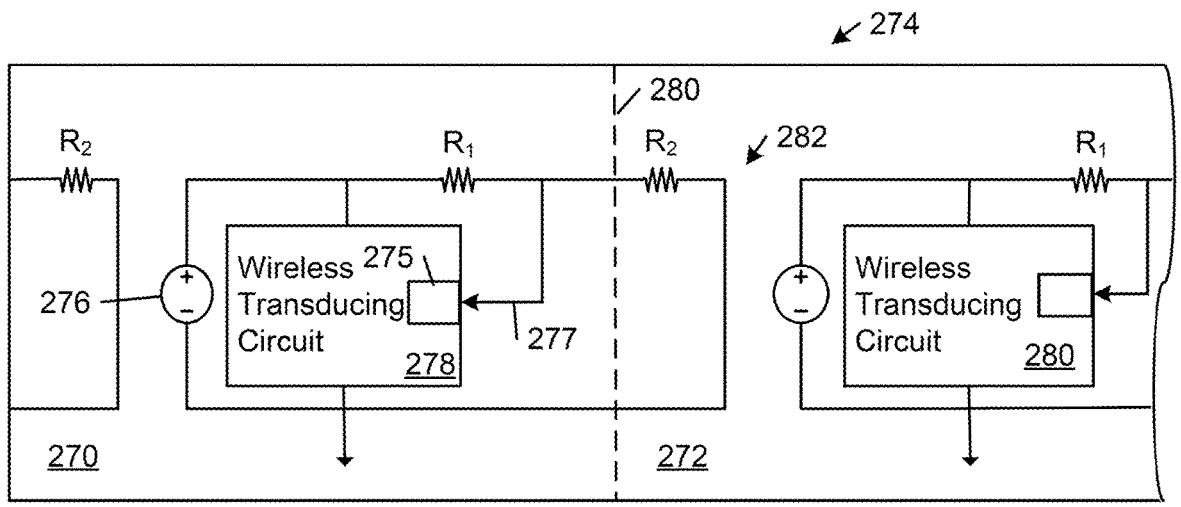
FIGS. 6A-6B are diagrammatic top views of a length of an example adhesive tape platform, according to some embodiments.

Referring to FIG. 6A, in some examples, each of one or more of the segments 270, 272 of a flexible adhesive tape platform 274 includes a respective one-time wake circuit 275 that delivers power from the respective energy source 276 to the respective wireless circuit 278 (e.g., a processor, one or more transducers, and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment from the adhesive tape platform 274, for example, by cutting across the adhesive tape platform 274 at a designated location (e.g., along a designated cut-line 280). In particular, in its initial, un-cut state, a minimal amount of current flows through the resistors R1 and R2. As a result, the voltage on the wake node 277 remains below the threshold turn-on level. After the user cuts across the adhesive tape platform 274 along the designated cut-line 280, the user creates an open circuit in the loop 282, which pulls the voltage of the wake node above the threshold level and turns on the wake circuit 275. As a result, the voltage across the energy source 276 will appear across the wireless circuit 278 and, thereby, turn on the segment 270. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of an adhesive tape platform includes a respective sensor and a respective wake circuit that delivers power from the respective energy source to the respective one or more of the respective wireless circuit components 278 in response to an output of the sensor. In some examples, the respective sensor is a strain sensor that produces a wake signal based on a change in strain in the respective segment. In some of these examples, the strain sensor is affixed to a adhesive tape platform and configured to detect the stretching of the tracking adhesive tape platform segment as the segment is being peeled off a roll or a sheet of the adhesive tape platform. In some examples, the respective sensor is a capacitive sensor that produces a wake signal based on a change in capacitance in the respective segment. In some of these examples, the capacitive sensor is affixed to an adhesive tape platform and configured to detect the separation of the tracking adhesive tape platform segment from a roll or a sheet of the adhesive tape platform. In some examples, the respective sensor is a flex sensor that produces a wake signal based on a change in curvature in the respective segment. In some of these examples, the flex sensor is affixed to a adhesive tape platform and configured to detect bending of the tracking adhesive tape platform segment as the segment is being peeled off a roll or a sheet of the adhesive tape platform. In some examples, the respective sensor is a near field communications sensor that produces a wake signal based on a change in inductance in the respective segment.

Figure 6B:
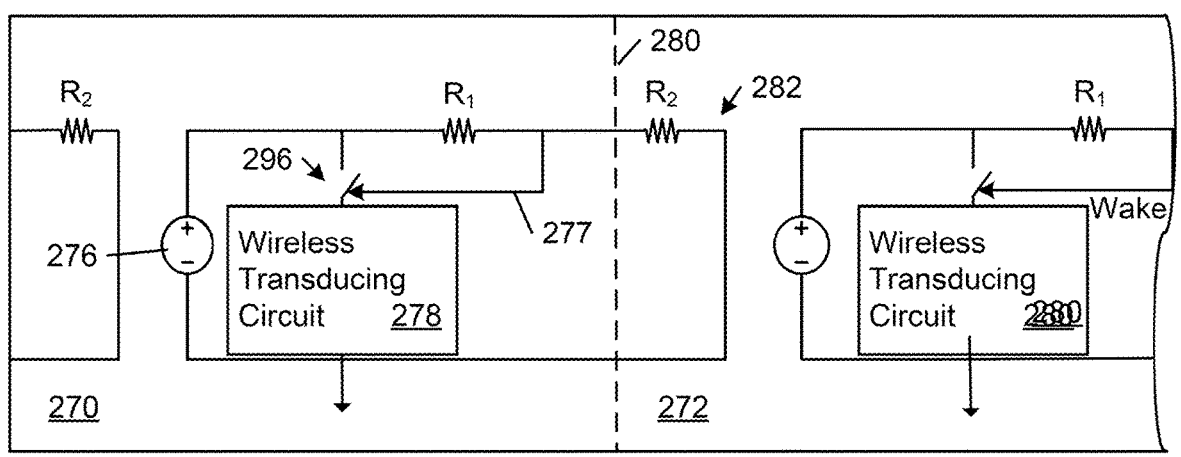

FIG. 6B shows another example of an adhesive tape platform 294 that delivers power from the respective energy source 276 to the respective tracking circuit 278 (e.g., a processor, one or more transducers, and one or more wireless communications circuits) in response to an event. This example is similar in structure and operation as the adhesive tape platform 294 shown in FIG. 6A, except that the wake circuit 275 is implemented by a switch 296 that is configured to transition from an open state to a closed state when the voltage on the switch node 277 exceeds a threshold level. In the initial state of the adhesive tape platform 294, the voltage on the switch node is below the threshold level as a result of the low current level flowing through the resistors R1 and R2. After the user cuts across the adhesive tape platform 294 along the designated cut-line 280, the user creates an open circuit in the loop 282, which pulls up the voltage on the switch node above the threshold level to close the switch 296 and turn on the wireless circuit 278.

Figure 6C:
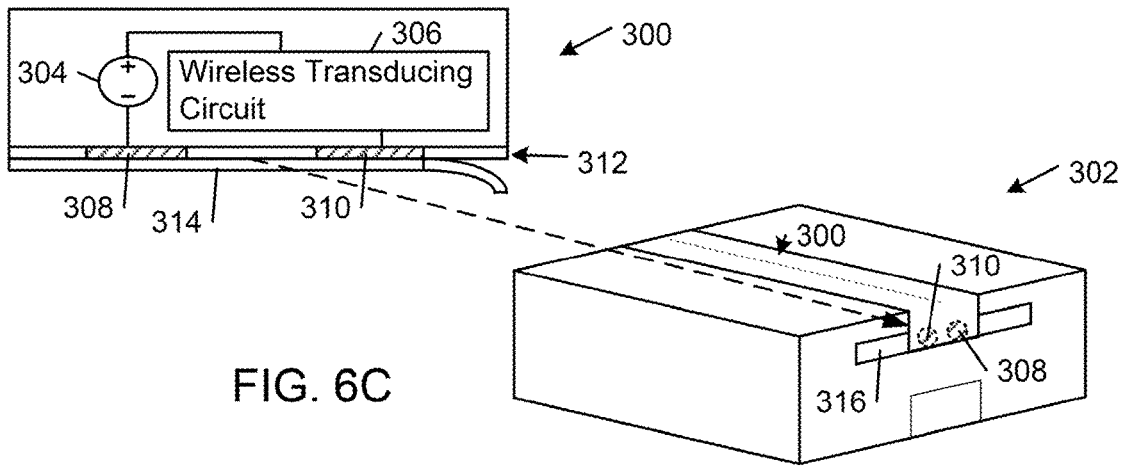
FIG. 6C is a diagrammatic view of a length of an example adhesive tape platform adhered to an asset, according to some embodiments.

FIG. 6C shows a diagrammatic cross-sectional front view of an example adhesive tape platform 300 and a perspective view of an example asset 302. Instead of activating the adhesive tape platform in response to separating a segment of the adhesive tape platform from a roll or a sheet of the adhesive tape platform, this example is configured to supply power from the energy source 302 to turn on the wireless transducing circuit 306 in response to establishing an electrical connection between two power terminals 308, 310 that are integrated into the adhesive tape platform. In particular, each segment of the adhesive tape platform 300 includes a respective set of embedded tracking components, an adhesive layer 312, and an optional backing sheet 314 with a release coating that prevents the segments from adhering strongly to the backing sheet 314. In some examples, the power terminals 308, 310 are composed of an electrically conductive material (e.g., a metal, such as copper) that may be printed or otherwise patterned and/or deposited on the backside of the adhesive tape platform 300. In operation, the adhesive tape platform can be activated by removing the backing sheet 314 and applying the exposed adhesive layer 312 to a surface that includes an electrically conductive region 316. In the illustrated embodiment, the electrically conductive region 316 is disposed on a portion of the asset 302. When the adhesive backside of the adhesive tape platform 300 is adhered to the asset with the exposed terminals 308, 310 aligned and in contact with the electrically conductive region 316 on the asset 302, an electrical connection is created through the electrically conductive region 316 between the exposed terminals 308, 310 that completes the circuit and turns on the wireless transducing circuit 306. In particular embodiments, the power terminals 308, 310 are electrically connected to any respective nodes of the wireless transducing circuit 306 that would result in the activation of the tracking circuit 306 in response to the creation of an electrical connection between the power terminals 308, 310.

In some examples, after a tape node is turned on, it will communicate with the network service to confirm that the user/operator who is associated with the tape node is an authorized user who has authenticated himself or herself to the network service 54. In these examples, if the tape node cannot confirm that the user/operator is an authorized user, the tape node will turn itself off.

Deployment of Tape Nodes

Figure 7:
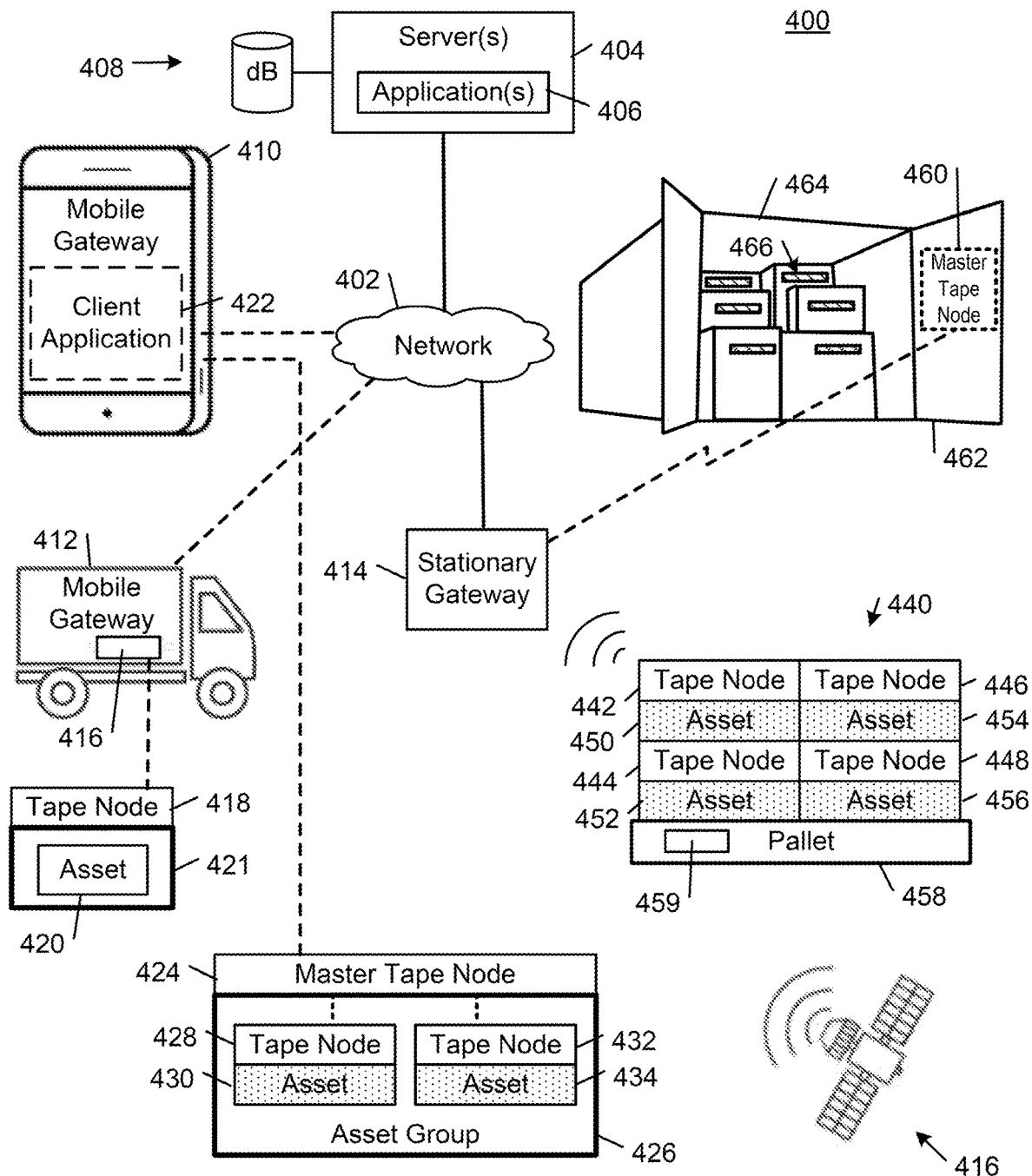
FIG. 7 is a diagrammatic view of an example of a network environment supporting communications with segments of an adhesive tape platform, according to some embodiments.

FIG. 7 shows an example network communications environment 400 (also referred to herein as an "IOT system" 400, "asset tracking system" 400, or "tracking system" 400) that includes a network 402 that supports communications between one or more servers 404 executing one or more applications of a network service 408, mobile gateways 410, 412, a stationary gateway 414, and various types of tape nodes that are associated with various assets (e.g., parcels, equipment, tools, persons, and other things) Each member of the IOT system 400 may be referred to as a node of the IOT system 400, including the tape nodes, other wireless IOT devices, gateways (stationary and mobile), client devices, and servers. In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system 416 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications 406 leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link the communication uses the infrastructure security mechanisms. In case of communications among tapes nodes, the communication is secured through a custom security mechanism. In certain cases, tape nodes can also be configured to support block chain to protect the transmitted and stored data.

A set of tape nodes can be configured by the network service 408 to create hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. In this process, a tape node typically is separated from a roll or sheet and adhered to a asset, or other stationary or mobile object (e.g., a structural element of a warehouse, or a vehicle, such as a delivery truck) or stationary object (e.g., a structural element of a building). This process activates the tape node and causes the tape node to communicate with a server 404 of the network service 408. In this process, the tape node may communicate through one or more other tape nodes in the communication hierarchy. In this process, the network server 404 executes the network service application 406 to programmatically configure tape nodes that are deployed in the environment 400. In some examples, there are multiple classes or types of tape nodes, where each tape node class has a different respective set of functionalities and/or capacities.

In some examples, the one or more network service servers 404 communicate over the network 402 with one or more gateways that are configured to send, transmit, forward, or relay messages to the network 402 and activated tape nodes that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated set of tape nodes, including a peripheral tape node 418 in the form of a label that is adhered to an asset 420 contained within a parcel 421 (e.g., an envelope), and is further configured to communicate with the network service 408 over the network 402. In some examples, the peripheral tape node 418 includes a lower power wireless communications interface of the type used in, e.g., tape node 102 (shown in FIG. 5A), and the wireless communications unit 416 is implemented by a tape node (e.g., one of tape node 103 or tape node 105, respectively shown in FIGS. 5B and 5C) that includes a lower power communications interface for communicating with tape nodes within range of the mobile gateway 412 and a higher power communications interface for communicating with the network 402. In this way, the tape nodes 418 and 416 create a hierarchical wireless network of nodes for transmitting, forwarding, bridging, relaying, or otherwise communicating wireless messages to, between, or on behalf of the peripheral tape node 418 and the network service 408 in a power-efficient and cost-effective way.

In some examples, the mobile gateway 410 is a mobile phone that is operated by a human operator and executes a client application 422 that is configured by the network service 408 to communicate with a designated set of tape nodes, including a master tape node 424 that is adhered to a parcel 426 (e.g., a box), and is further configured to communicate with the network service 408 over the network 402. In the illustrated example, the parcel 426 contains a first parcel labeled or sealed by a tape node 428 and containing a first asset 430, and a second parcel labeled or sealed by a tape node 432 and containing a second asset 434. As explained in detail below, the master tape node 424 communicates with each of the peripheral tape nodes 428, 432 and communicates with the mobile gateway 408 in accordance with a hierarchical wireless network of tape nodes. In some examples, each of the peripheral tape nodes 428, 432 includes a lower power wireless communications interface of the type used in, e.g., tape node 102 (shown in FIG. 5A), and the master tape node 424 is implemented by a tape node (e.g., tape node 103, shown in FIG. 5B) that includes a lower power communications interface for communicating with the peripheral tape nodes 428, 432 contained within the parcel 426, and a higher power communications interface for communicating with the mobile gateway 410. The master tape node 424 is operable to relay wireless communications between the tape nodes 428, 432 contained within the parcel 426 and the mobile gateway 410, and the mobile gateway 410 is operable to relay wireless communications between the master tape node 424 and the network service 408 over the wireless network 402. In this way, the master tape node 424 and the peripheral tape nodes 428 and 432 create a hierarchical wireless network of nodes for transmitting, forwarding, relaying, or otherwise communicating wireless messages to, between, or on behalf of the peripheral tape nodes 428, 432 and the network service 408 in a power-efficient and cost-effective way.

In some examples, the stationary gateway 414 is implemented by a server executing a server application that is configured by the network service 408 to communicate with a designated set 440 of tape nodes 442, 444, 446, 448 that are adhered to respective parcels containing respective assets 450, 452, 454, 456 on a pallet 458. In other examples, the stationary gateway 414 is implemented by a tape node (e.g., one of tape node 103 or tape node 105, respectively shown in FIGS. 5B and 5C) that is adhered to, for example, a wall, column or other infrastructure component of the environment 400, and includes a lower power communications interface for communicating with tape nodes within range of the stationary gateway 414 and a higher power communications interface for communicating with the network 402. In one embodiment, each of the tape nodes 442-448 is a peripheral tape node and is configured by the network service 408 to communicate individually with the stationary gateway 414, which relays communications from the tape nodes 442-448 to the network service 408 through the stationary gateway 414 and over the communications network 402. In another embodiment, one of the tape nodes 442-448 at a time is configured as a master tape node that transmits, forwards, relays, or otherwise communicate wireless messages to, between, or on behalf of the other tape nodes on the pallet 458. In this embodiment, the master tape node may be determined by the tape nodes 442-448 or designated by the network service 408. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 459 is adhered to the pallet 458 and is configured to perform the role of a master node for the tape nodes 442-448. In these ways, the tape nodes 442-448, 458 are configurable to create different hierarchical wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated set of tape nodes, including a master tape node 460 that is adhered to the inside of a door 462 of a shipping container 464, and is further configured to communicate with the network service 408 over the network 402. In the illustrated example, the shipping container 464 contains a number of parcels labeled or sealed by respective peripheral tape nodes 466 and containing respective assets. The master tape node 416 communicates with each of the peripheral tape nodes 466 and communicates with the stationary gateway 415 in accordance with a hierarchical wireless network of tape nodes. In some examples, each of the peripheral tape nodes 466 includes a lower power wireless communications interface of the type used in, e.g., tape node 102 (shown in FIG. 5A), and the master tape node 460 is implemented by a tape node (e.g., tape node 103, shown in FIG. 5B) that includes a lower power communications interface for communicating with the peripheral tape nodes 466 contained within the shipping container 464, and a higher power communications interface for communicating with the stationary gateway 414.

In some examples, when the doors of the shipping container 464 are closed, the master tape node 460 is operable to communicate wirelessly with the peripheral tape nodes 466 contained within the shipping container 464. In an example, the master tape node 460 is configured to collect sensor data from the peripheral tape nodes and, in some embodiments, process the collected data to generate, for example, one or more histograms from the collected data. When the doors of the shipping container 464 are open, the master tape node 460 is programmed to detect the door opening (e.g., with an accelerometer component of the master tape node 460) and, in addition to reporting the door opening event to the network service 408, the master tape node 460 is further programmed to transmit the collected data and/or the processed data in one or more wireless messages to the stationary gateway 414. The stationary gateway 414, in turn, is operable to transmit the wireless messages received from the master tape node 460 to the network service 408 over the wireless network 402. Alternatively, in some examples, the stationary gateway 414 also is operable to perform operations on the data received from the master tape node 460 with the same type of data produced by the master node 459 based on sensor data collected from the tape nodes 442-448. In this way, the master tape node 460 and the peripheral tape nodes 466 create a hierarchical wireless network of nodes for transmitting, forwarding, relaying, or otherwise communicating wireless messages to, between, or on behalf of the peripheral tape nodes 466 and the network service 408 in a power-efficient and cost-effective way.

In an example of the embodiment shown in FIG. 7, there are three classes of tape nodes: a short range tape node, a medium range tape node, and a long range tape node, as respectively shown in FIGS. 5A-5C. The short range tape nodes typically are adhered directly to parcels containing assets. In the illustrated example, the tape nodes 418, 428, 432, 442-448, 466 are short range tape nodes. The short range tape nodes typically communicate with a low power wireless communication protocol (e.g., Bluetooth LE, Zigbee, or Z-wave). The medium range tape nodes typically are adhered to objects (e.g., a box 426 and a shipping container 460) that are associated with multiple parcels that are separated from the medium range tape nodes by a barrier or a large distance. In the illustrated example, the tape nodes 424 and 460 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 400. In the illustrated example, the mobile gateway tape node 412 and the stationary gateway tape node 414 are long range tape nodes. The long range tape nodes typically communicate with other nodes using a high power wireless communication protocol (e.g., a cellular data communication protocol). In some examples, the mobile gateway tape node 436 is adhered to a mobile vehicle (e.g., a truck). In these examples, the mobile gateway 412 may be moved to different locations in the environment 400 to assist in connecting other tape nodes to the server 404. In some examples, the stationary gateway tape node 414 may be attached to a stationary structure (e.g., a wall) in the environment 400 with a known geographic location. In these examples, other tape nodes in the environment can determine their geographic location by querying the gateway tape node 414.

Wireless Communications Network

Figure 8:
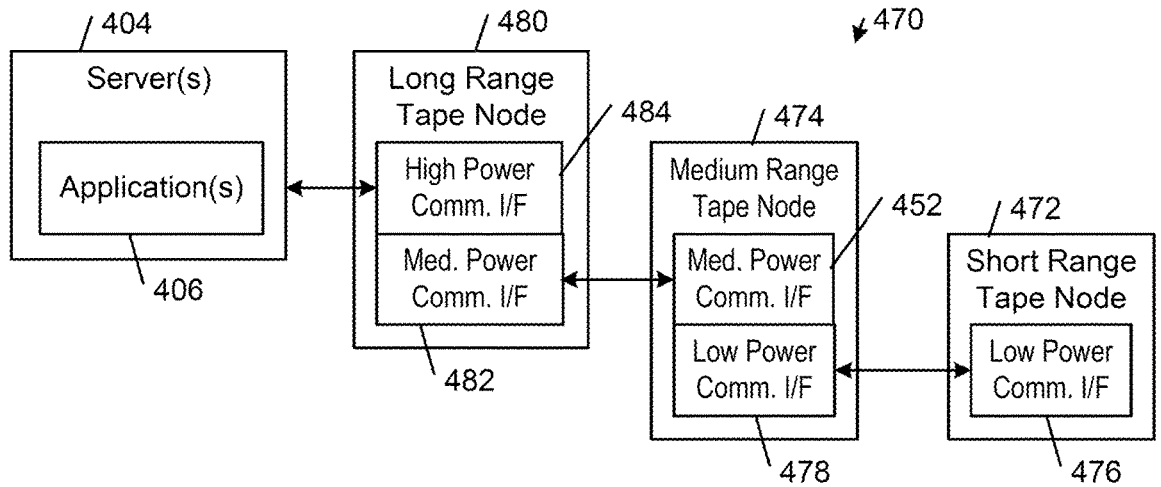
FIG. 8 is a diagrammatic view of a hierarchical communications network, according to some embodiments.

FIG. 8 shows an example hierarchical wireless communications network of tape nodes 470. In this example, the short range tape node 472 and the medium range tape node 474 communicate with one another over their respective low power wireless communication interfaces 476, 478. The medium range tape node 474 and the long range tape node 480 communicate with one another over their respective medium power wireless communication interfaces 478, 482. The long range tape node 480 and the network server 404 communicate with one another over the high power wireless communication interface 484. In some examples, the low power communication interfaces 476, 478 establish wireless communications with one another in accordance with the Bluetooth LE protocol, the medium power communication interfaces 452, 482 establish wireless communications with one another in accordance with the LoRa communications protocol, and the high power communication interface 484 establishes wireless communications with the server 404 in accordance with a cellular communications protocol.

In some examples, the different types of tape nodes are deployed at different levels in the communications hierarchy according to their respective communications ranges, with the long range tape nodes generally at the top of the hierarchy, the medium range tape nodes generally in the middle of the hierarchy, and the short range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, a server 404 of the network service 408 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more assets containing respective assets. In order to conserve power, the tape nodes typically communicate according to a schedule promulgated by the server 404 of the network service 408. The schedule usually dictates all aspects of the communication, including the times when particular tape nodes should communicate, the mode of communication, and the contents of the communication. In one example, the server 404 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server network node 404, either directly or indirectly through a gateway tape node (e.g., the long range tape node 416 adhered to the mobile vehicle 412 or the long range tape node 414 adhered to an infrastructure component of the environment 400). In other examples, the master tape node processes the information contained in the received data packets and transmits the processed information to the server network node 404.

Figure 9:
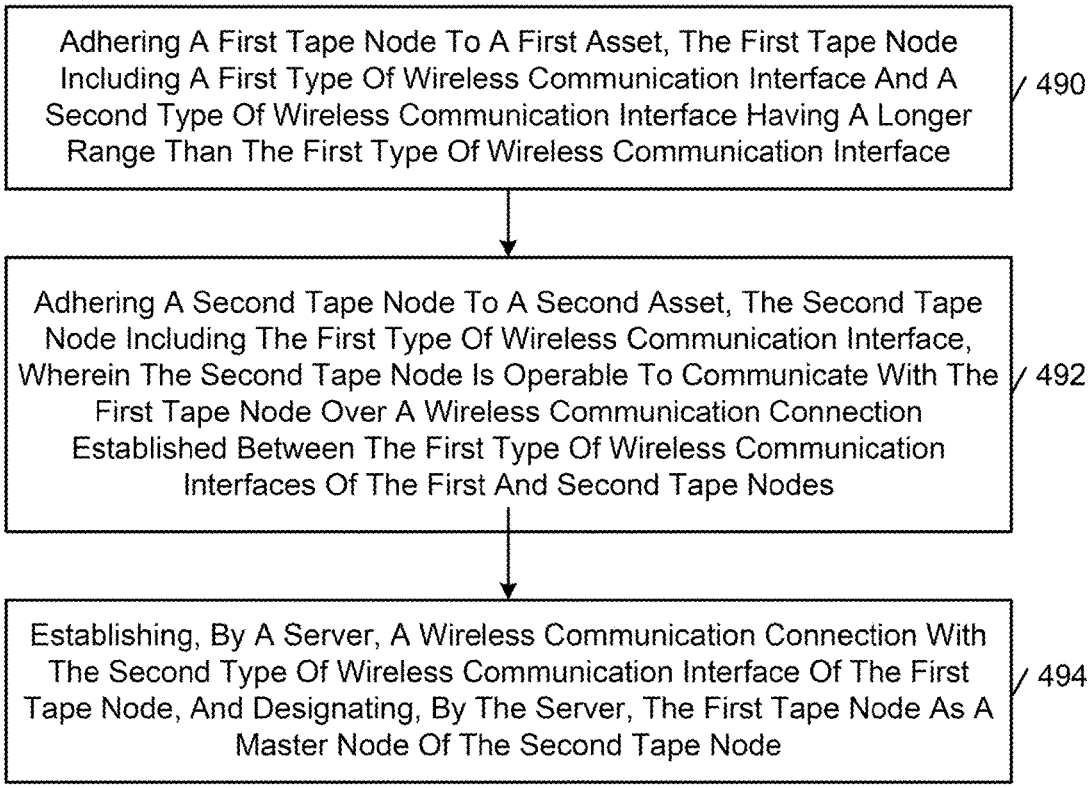
FIG. 9 is a flow diagram of a method of creating a hierarchical communications network, according to some embodiments.

FIG. 9 shows an example method of creating a hierarchical communications network. In accordance with this method, a first tape node is adhered to a first asset in a set of associated assets, the first tape node including a first type of wireless communication interface and a second type of wireless communication interface having a longer range than the first type of wireless communication interface (FIG. 9, block 490). A second tape node is adhered to a second asset in the set, the second tape node including the first type of wireless communication interface, wherein the second tape node is operable to communicate with the first tape node over a wireless communication connection established between the first type of wireless communication interfaces of the first and second tape nodes (FIG. 9, block 492). An application executing on a computer system (e.g., a server 404 of a network service 408) establishes a wireless communication connection with the second type of wireless communication interface of the first tape node, and the application transmits programmatic code executable by the first tape node to function as a master tape node with respect to the second tape node (FIG. 9, block 494).

In other embodiments, the second tape node is assigned the role of the master node of the first tape node.

Distributed Agent Operating System

As used herein, the term "node" refers to both a tape node and a non-tape node (i.e., a node or wireless device that is not an adhesive tape platform) unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node may be assigned a respective unique identifier, according to some embodiments.

The following disclosure describes a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node's mission (or objective) is defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services define the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower power level, temperature reading, send an alert to local hub, send location data, triangulate location, any boxes in same group that already completed group objectives.

Nodes can be associated with items. Examples of an item includes, but are not limited to for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the items.

Communication paths between tape and/or non-tape nodes may be represented by a graph of edges between the corresponding assets (e.g., a storage unit, truck, or hub). In some embodiments, each node in the graph has a unique identifier. A set of connected edges between nodes is represented by a sequence of the node identifiers that defines a communication path between a set of nodes.

Figure 10A:
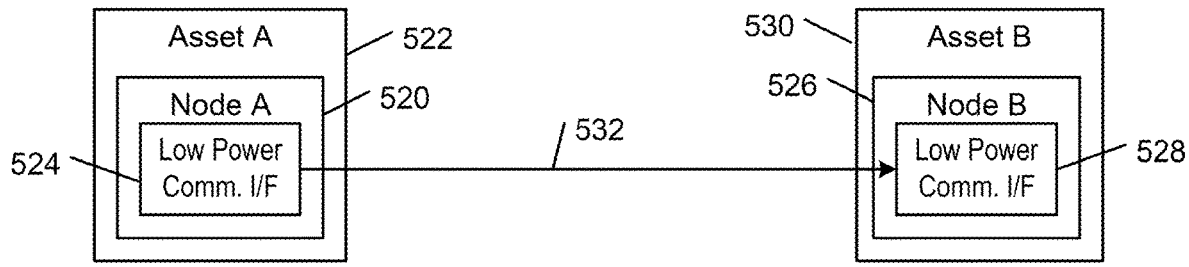
FIGS. 10A-10E are diagrammatic views of exemplary use cases for a distributed agent operating system, according to some embodiments.

Referring to FIG. 10A, a node 520 (Node A) is associated with an asset 522 (Asset A). In some embodiments, the node 520 may be implemented as a tape node that is used to seal the asset 522 or it may be implemented as a label node that is used to label the asset 522; alternatively, the node 520 may be implemented as a non-tape node that is inserted within the asset 522 or embedded in or otherwise attached to the interior or exterior of the asset 522. In the illustrated embodiment, the node 520 includes a low power communications interface 524 (e.g., a Bluetooth Low Energy communications interface). Another node 526 (Node B), which is associated with another asset 530 (Asset B), is similarly equipped with a compatible low power communications interface 528 (e.g., a Bluetooth Low Energy communications interface).

In an example scenario, in accordance with the programmatic code stored in its memory, node 526 (Node B) requires a connection to node 520 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 520 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 532 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 10B:
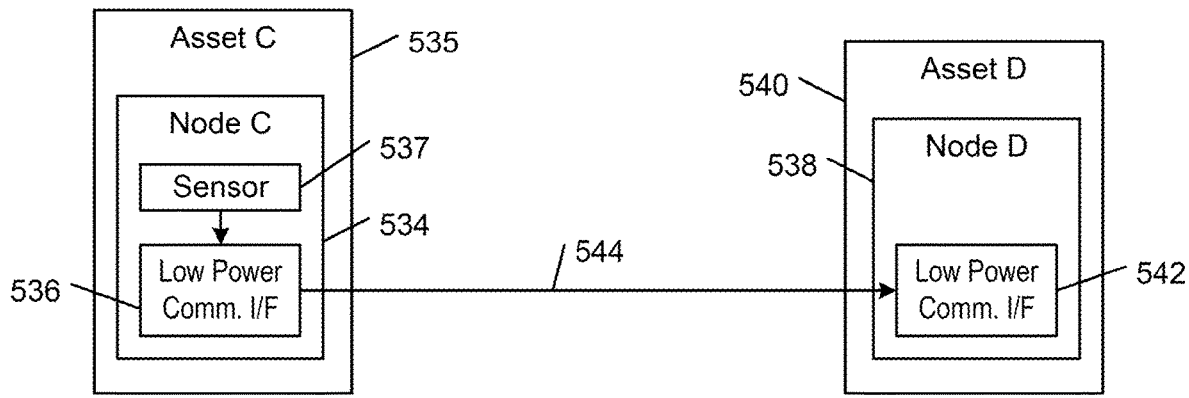

Referring to FIG. 10B, a node 534 (Node C) is associated with an asset 535 (Asset C). In the illustrated embodiment, the Node C includes a low power communications interface 536 (e.g., a Bluetooth Low Energy communications interface), and a sensor 537 (e.g., a temperature sensor). Another node 538 (Node D), which is associated with another asset 540 (Asset D), is similarly equipped with a compatible low power communications interface 542 (e.g., a Bluetooth Low Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 544 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
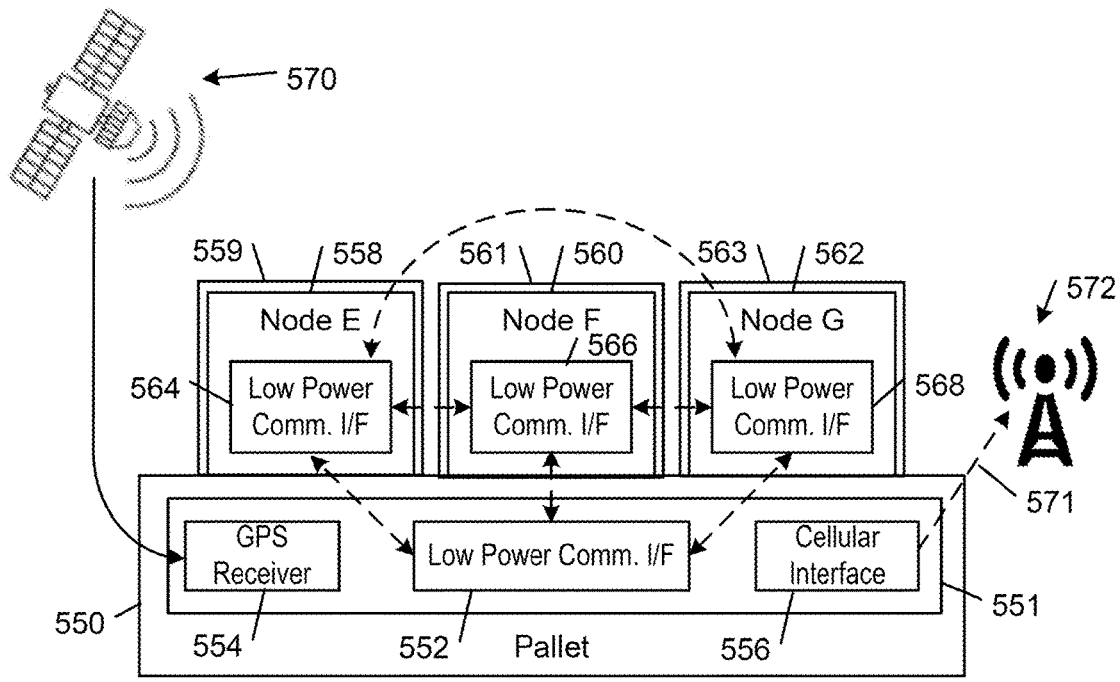

Referring to FIG. 10C, a pallet 550 is associated with a master node 551 that includes a low power communications interface 552, a GPS receiver 554, and a cellular communications interface 556. In some embodiments, the master node 551 may be implemented as a tape node or a label node that is adhered to the pallet 550. In other embodiments, the master node 551 may be implemented as a non-tape node that is inserted within the body of the pallet 550 or embedded in or otherwise attached to the interior or exterior of the pallet 550.

The pallet 550 provides a structure for grouping and containing assets 559, 561, 563 each of which is associated with a respective peripheral node 558, 560, 562 (Node E, Node F, and Node G). Each of the peripheral nodes 558, 560, 562 includes a respective low power communications interface 564, 566, 568 (e.g., Bluetooth Low Energy communications interface). In the illustrated embodiment, each of the nodes E, F, G and the master node 551 are connected to each of the other nodes over a respective low power communications path (shown by dashed lines).

In some embodiments, the assets 559, 561, 563 are grouped together because they are related. For example, the assets 559, 561, 563 may share the same shipping itinerary or a portion thereof. In an example scenario, the master pallet node 550 scans for advertising packets that are broadcasted from the peripheral nodes 558, 560, 562. In some examples, the peripheral nodes broadcast advertising packets during respective scheduled broadcast intervals. The master node 551 can determine the presence of the assets 559, 561, 563 in the vicinity of the pallet 550 based on receipt of one or more advertising packets from each of the nodes E, F, and G. In some embodiments, in response to receipt of advertising packets broadcasted by the peripheral nodes 558, 560, 562, the master node 551 transmits respective requests to the server to associate the master node 551 and the respective peripheral nodes 558, 560, 562. In some examples, the master tape node requests authorization from the server to associate the master tape node and the peripheral tape nodes. If the corresponding assets 559, 561, 563 are intended to be grouped together (e.g., they share the same itinerary or certain segments of the same itinerary), the server authorizes the master node 551 to associate the peripheral nodes 558, 560, 562 with one another as a grouped set of assets. In some embodiments, the server registers the master node and peripheral tape node identifiers with a group identifier. The server also may associate each node ID with a respective physical label ID that is affixed to the respective asset.

In some embodiments, after an initial set of assets is assigned to a multi-asset group, the master node 551 may identify another asset arrives in the vicinity of the multi-asset group. The master node may request authorization from the server to associate the other asset with the existing multi-asset group. If the server determines that the other asset is intended to ship with the multi-asset group, the server instructs the master node to merge one or more other assets with currently grouped set of assets. After all assets are grouped together, the server authorizes the multi-asset group to ship. In some embodiments, this process may involve releasing the multi-asset group from a containment area (e.g., customs holding area) in a shipment facility.

In some embodiments, the peripheral nodes 558, 560, 562 include environmental sensors for obtaining information regarding environmental conditions in the vicinity of the associated assets 559, 561, 563. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 551 can determine its own location based on geolocation data transmitted by a satellite-based radio navigation system 570 (e.g., GPS, GLONASS, and NAVSTAR) and received by the GPS receiver 554 component of the master node 551. In an alternative embodiment, the location of the master pallet node 551 can be determined using cellular based navigation techniques that use mobile communication technologies (e.g., GSM, GPRS, CDMA, etc.) to implement one or more cell-based localization techniques. After the master node 551 has ascertained its location, the distance of each of the assets 559, 561, 563 from the master node 551 can be estimated based on the average signal strength of the advertising packets that the master node 551 receives from the respective peripheral node. The master node 551 can then transmit its own location and the locations of the asset nodes E, F, and G to a server over a cellular interface connection with a cell tower 572. Other methods of determining the distance of each of the assets 559, 561, 563 from the master node 551, such as Received Signal-Strength Index (RSSI) based indoor localization techniques, also may be used.

In some embodiments, after determining its own location and the locations of the peripheral nodes, the master node 551 reports the location data and the collected and optionally processed (e.g., either by the peripheral nodes peripheral nodes 558, 560, 562 or the master node 551) sensor data to a server over a cellular communication path 571 on a cellular network 572.

In some examples, nodes are able to autonomously detect logistics execution errors if assets that suppose to travel together no longer travel together, and raise an alert. For example, a node (e.g., the master node 551 or one of the peripheral nodes 558, 560, 562) alerts the server when the node determines that a particular asset 559 is being or has already been improperly separated from the group of assets. The node may determine that there has been an improper separation of the particular asset 559 in a variety of ways. For example, the associated node 558 that is bound to the particular asset 559 may include an accelerometer that generates a signal in response to movement of the asset from the pallet. In accordance with its intelligent agent program code, the associated node 558 determines that the master node 551 has not disassociated the particular asset 559 from the group and therefore broadcasts advertising packets to the master node, which causes the master node 551 to monitor the average signal strength of the advertising packets and, if the master node 551 determines that the signal strength is decreasing over time, the master node 551 will issue an alert either locally (e.g., through a speaker component of the master node 551) or to the server.

Figure 10D:
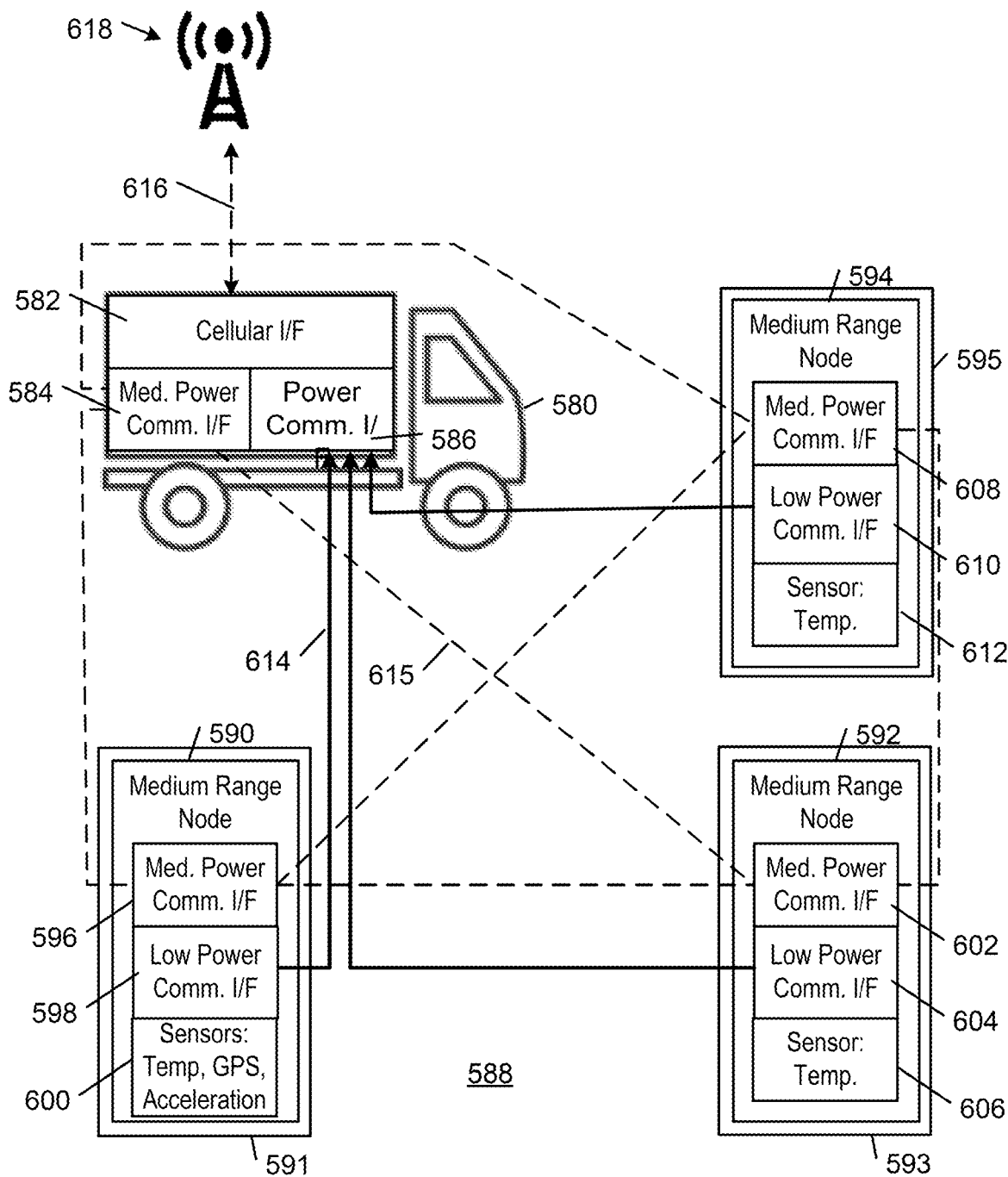

Referring to FIG. 10D, a truck 580 is configured as a mobile node or mobile hub that includes a cellular communications interface 582, a medium power communications interface 584, and a low power communications interface 586. The communications interfaces 580-586 may be implemented on one or more tape and non-tape nodes. In an illustrative scenario, the truck 580 visits a storage facility, such as a warehouse 588, to wirelessly obtain temperature data generated by temperature sensors in the medium range nodes 590, 592, 594. The warehouse 588 contains nodes 590, 592, and 594 that are associated with respective assets 591, 593, 595. In the illustrated embodiment, each node 590-594 is a medium range node that includes a respective medium power communications interface 596, 602, 608, a respective low power communications interface 598, 604, 610 and one or more respective sensors 600, 606, 612. In the illustrated embodiment, each of the asset nodes 590, 592, 594 and the truck 580 is connected to each of the other ones of the asset nodes through a respective medium power communications path (shown by dashed lines). In some embodiments, the medium power communications paths are LoRa formatted communication paths.

In some embodiments, the communications interfaces 584 and 586 (e.g., a LoRa communications interface and a Bluetooth Low Energy communications interface) on the node on the truck 580 is programmed to broadcast advertisement packets to establish connections with other network nodes within range of the truck node. A warehouse 588 includes medium range nodes 590, 592, 594 that are associated with respective containers 591, 593, 595 (e.g., assets, boxes, pallets, and the like). When the truck node's low power interface 586 is within range of any of the medium range nodes 590, 592, 594 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 590, 592, 594, the truck node will attempt to pair with the medium range node. In this process, the truck node and the medium range node determine each other's identities, capabilities, and services.

For example, after successfully establishing a communication path with the truck node (e.g., a Bluetooth Low Energy formatted communication path 614 or a LoRa formatted communication path 615), the truck node determines the identity information for the medium range node 590 (e.g., a peripheral node), the medium range node's capabilities include retrieving temperature data, and the medium range node's services include transmitting temperature data to other nodes. Depending of the size of the warehouse 588, the truck 580 initially may communicate with the nodes 590, 592, 594 using a low power communications interface (e.g., Bluetooth Low Energy interface). If any of the anticipated nodes fails to respond to repeated broadcasts of advertising packets by the truck 580, the truck 580 will try to communicate with the non-responsive nodes using a medium power communications interface (e.g., LoRa interface). In response to a request from the truck node 584, the medium range node 590 transmits an indication of its measured temperature data to the truck node. The truck node repeats the process for each of the other medium range nodes 592, 594 that generate temperature measurement data in the warehouse 588. The truck node reports the collected (and optionally processed, either by the medium range nodes 590, 592, 594 or the truck node) temperature data to a server over a cellular communication path 616 with a cellular network 618.

Figure 10E:
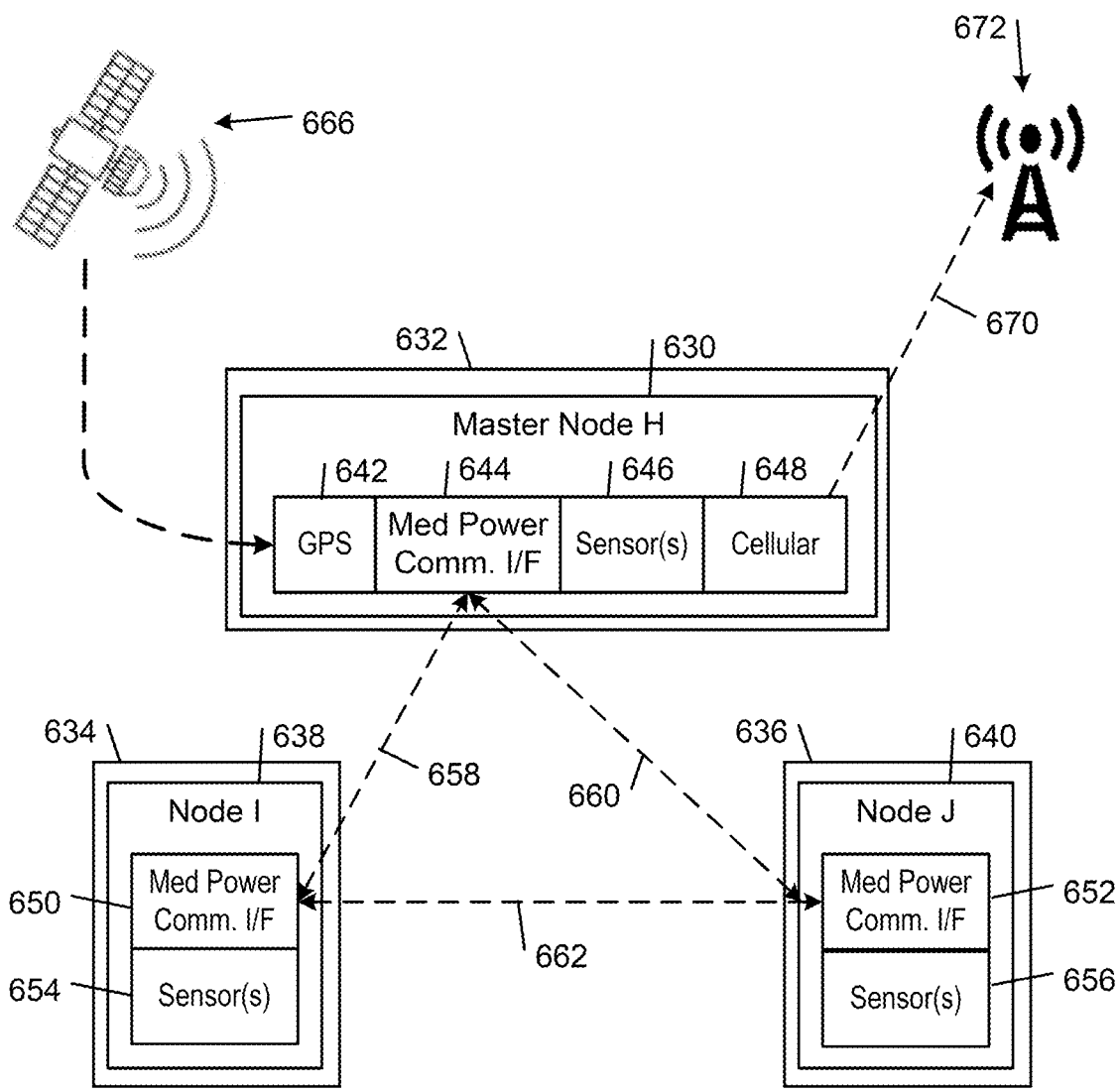

Referring to FIG. 10E, a master node 630 is associated with an item 632 (e.g., an asset) and grouped together with other items 634, 636 (e.g., assets) that are associated with respective peripheral nodes 638, 640. The master node 630 includes a GPS receiver 642, a medium power communications interface 644, one or more sensors 646, and a cellular communications interface 648. Each of the peripheral nodes 638, 640 includes a respective medium power communications interface 650, 652 and one or more respective sensors 654, 656. In the illustrated embodiment, the peripheral and master nodes are connected to one another other over respective pairwise communications paths (shown by dashed lines). In some embodiments, the nodes 630 638, 640 communicate through respective LoRa communications interfaces over LoRa formatted communications paths 658, 660, 662.

In the illustrated embodiment, the master and peripheral nodes 638, 638, 640 include environmental sensors for obtaining information regarding environmental conditions in the vicinity of the associated assets 632, 634, 636. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 630 periodically broadcasts advertising packets in the surrounding area. When the peripheral nodes 638, 640 are within range of master node 630, and are operating in a listening mode, the peripheral nodes 638, 640 will extract the address of master node 630 and potentially other information (e.g., security information) from the advertising packets. If, according to their respective programmatic code, the peripheral nodes 638, 640 determine that hey are authorized to connect to the master node 630, the peripheral nodes 638, 640 will attempt to pair with the master node 630. In this process, the peripheral nodes 638, 640 and the master node and the peripheral nodes determine each other's identities, capabilities, and services. For example, after successfully establishing a respective communication path 658, 660 with each of the peripheral nodes 638, 640 (e.g., a LoRa formatted communication path), the master node 630 determines certain information about the peripheral nodes 638, 640, such as their identity information (e.g., peripheral nodes), their capabilities (e.g., measuring temperature data), and their services include transmitting temperature data to other nodes.

After establishing LoRa formatted communications paths 658, 660 with the peripheral nodes 638, 640, the master node 630 transmits requests for the peripheral nodes 638, 640 to transmit their measured and/or locally processed temperature data to the master node 630.

In the illustrated embodiment, the master node 630 can determine its own location based on geolocation data transmitted by a satellite-based radio navigation system 666 (e.g., GPS, GLONASS, and NAVSTAR) and received by the GPS receiver 642 component of the master node 630. In an alternative embodiment, the location of the master node 630 can be determined using cellular based navigation techniques that use mobile communication technologies (e.g., GSM, GPRS, CDMA, etc.) to implement one or more cell-based localization techniques. After the master node 630 has ascertained its location, the distance of each of the assets 634, 636 from the master node 630 can be estimated based on the average signal strength of the advertising packets that the master node 630 receives from the respective peripheral node. The master node 630 can then transmit its own location and the locations of the asset nodes E, F, and G to a server over a cellular interface connection with a cell tower 672. Other methods of determining the distance of each of the assets 634, 636 from the master node 630, such as Received Signal-Strength Index (RSSI) based indoor localization techniques, also may be used.

In some embodiments, after determining its own location and the locations of the peripheral nodes, the master node 630 reports the location data the collected and optionally processed (e.g., either by the peripheral nodes peripheral nodes 634, 636 or the master node 630) sensor data to a server over a cellular communication path 670 on a cellular network 672.

Enhanced Border Protection and Security

Detection of tampering during the journey of a container aboard a vehicle are addressed by the disclosed system. Also, detection of tampering related to attempts to smuggle of rejected assets through a security checkpoint, attempts to smuggle assets in order to maliciously avoid an inspection that was deferred, and attempts to smuggle contraband are addressed by the disclosed system. The disclosed system includes long range scanner gateways that may communicate with and detect wireless nodes (e.g., tape nodes) on a boat, vehicle, or containers that are within a wireless range of the long range scanner gateways. The wireless range may be 2 miles or less, according to some embodiments. For example, the scanning gateways may be equipped with LoRa or LoRaWAN communication systems for communicating with wireless nodes on the ship, vehicle, or containers, according to some embodiments. The tamper detection system and long-range scanning gateways are discussed in further detail in U.S. patent application Ser. No. 17/449,582, filed Sep. 30, 2021, which is incorporated herein in its entirety. Tamper detecting tape nodes, as discussed herein, are also discussed in further detail in U.S. patent application Ser. No. 17/330,353, filed on May 25, 2021, which is incorporated herein in its entirety.

The long-range scanning gateways may have a medium range locationing ability to detect any medium-range tape nodes on containers or assets within a scanning range of the long-range scanning gateways, according to some embodiments. The scanning range may be 2-3 miles, according to further embodiments. Having a wireless range that's too large (e.g., greater than 2-3 miles) may result in bleed through of the locationing detection regions of the long-range scanning gateways within a security checkpoint. Bleed through results in ambiguity on where the asset or container is. Example wireless gateway nodes or beacons may use LoRa or LoRaWAN to communicate with tape nodes and gateway nodes on assets, containers, and transport vehicles (e.g., boats, trucks, cars, planes, etc.) to determine their location, without relying on GPS, in some embodiments.

Tamper detecting tape nodes may be installed on a container holding assets. The tamper detecting tape node may be attached inside, on, or on an exterior of the container. Container may be a sea container, shipping container, intermodal container, cargo area of a truck (e.g., a box truck), refrigerated container, etc. The tamper detecting tape node may include sensors for detecting tampering events. For example, a tamper detecting tape node may include a vibration sensor for measuring vibrations that occur on one or more surfaces of the container. The tamper detecting tape node may perform frequency analysis on detected vibrations to detect tampering events, such as a bad actor drilling into a hull of the container. By analyzing a frequency spectrum for vibrations, the tape node may differentiate between different tampering and non-tampering events. For example, an event of a bad actor drilling a hole in the container may have a vibrational harmonic at a first frequency, whereas non tampering events may not have a vibrational harmonic at the first frequency. Tampering events that are detected may include, but are not limited to: someone drilling a hole in the container, an unauthorized person opening the container, a person placing contraband inside the container, covering or otherwise concealing a hole or opening made in the container, removing hinges of a door of the container, or some other tampering event. Each tampering event may a have a different characteristic frequency spectrum for vibrations, that is differentiated by the tamper detecting tape node by comparing a measured vibrational frequency spectrum to a predetermined characteristic spectrum for the different types of tampering events. Thus, the tamper detecting tape node is operable to determine if tampering events have occurred and which kinds of tampering events have occurred.

In some embodiments, a vibration-sensing tamper detecting tape node is configured to perform high-end vibration frequency domain analysis of vibrations when attached to the container. The tamper detecting tape node is configured to perform a FFT of the vibrational data to generate a spectral plot of the vibration data captured during a period of time, according to some embodiments. The tape node may use a classifier to classify tampering events based on the sensed vibrations. In an example, the classifier receives vibration data, or receives vibrational spectral data (frequency domain vibrational data), such as an FFT of the vibration data and outputs a tampering event or non-tampering event based on the input data. The classifier may be a trained Machine learning (ML) model Sensors of the tamper detecting tape node other than vibration sensors may be used to detect tampering, in some embodiments. For example, a tamper detecting tape node may include a light sensor, a pressure sensor, another type of sensor, or some combination thereof to detect when the container has experienced unauthorized opening, accessing of the container, or tampering.

In some embodiments, the tamper detecting tape node communicates with one or more asset tape nodes attached to assets being stored inside the container. The tamper detecting tape node may store a manifest of identifiers associated with the asset tape nodes and the assets, in some embodiments. When tampering is detected, the tamper detecting tape node may instruct each of the asset tape nodes to individually store tampering event data on storage or memory of each of the asset tape nodes. Similarly, if a failed inspection of an asset occurs or an inspection of the asset is deferred, the tamper detecting tape node may store event data corresponding to the failed inspection or the deferred inspection. The tamper detecting tape node may instruct the respective asset tape node to store the event data on the respective asset tape node's storage or memory.

Figure 11A:
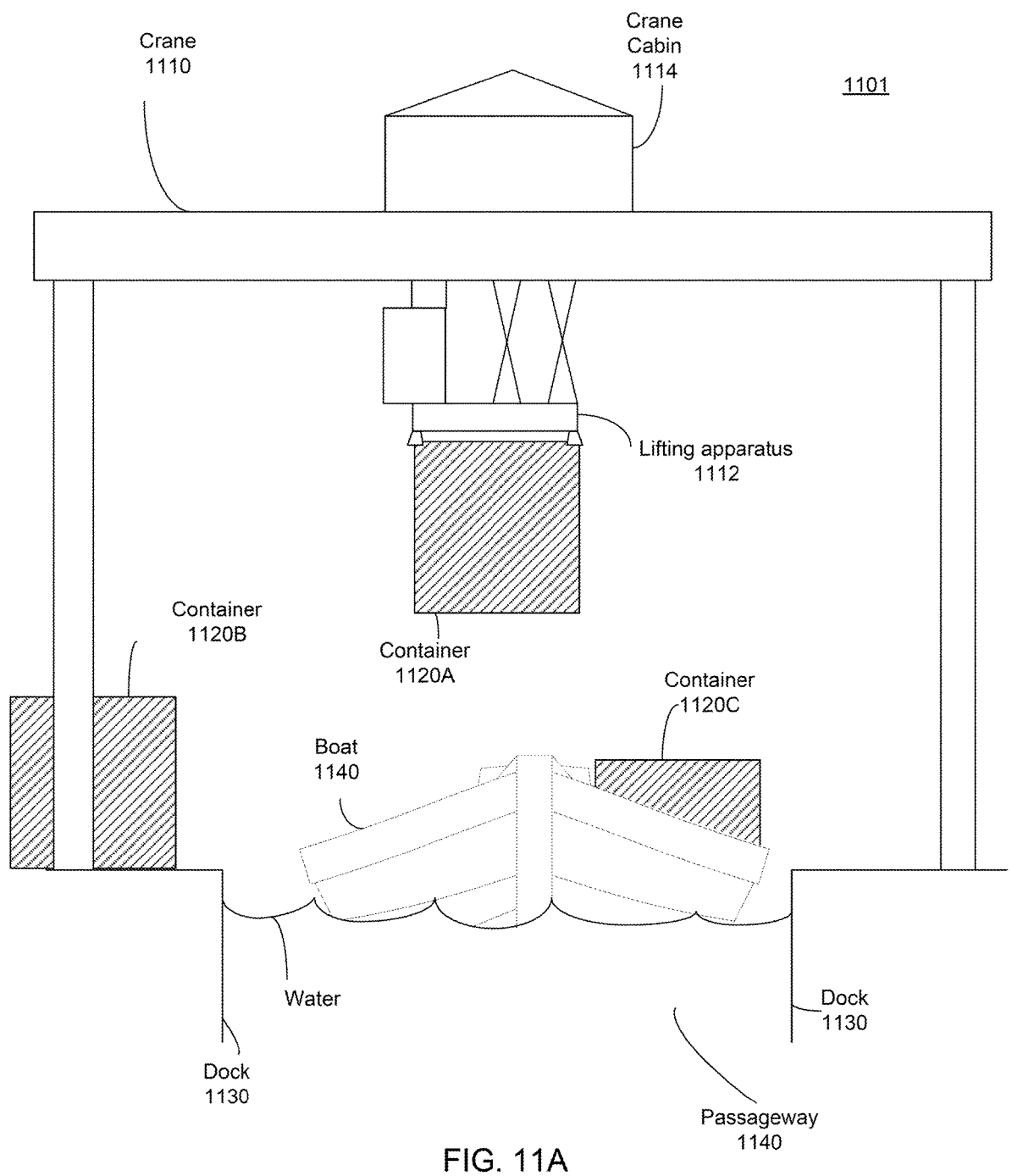
FIGS. 11A-11B show example diagrams of a port including cranes with lifting apparatuses for moving containers, according to some embodiments
Figure 11B:
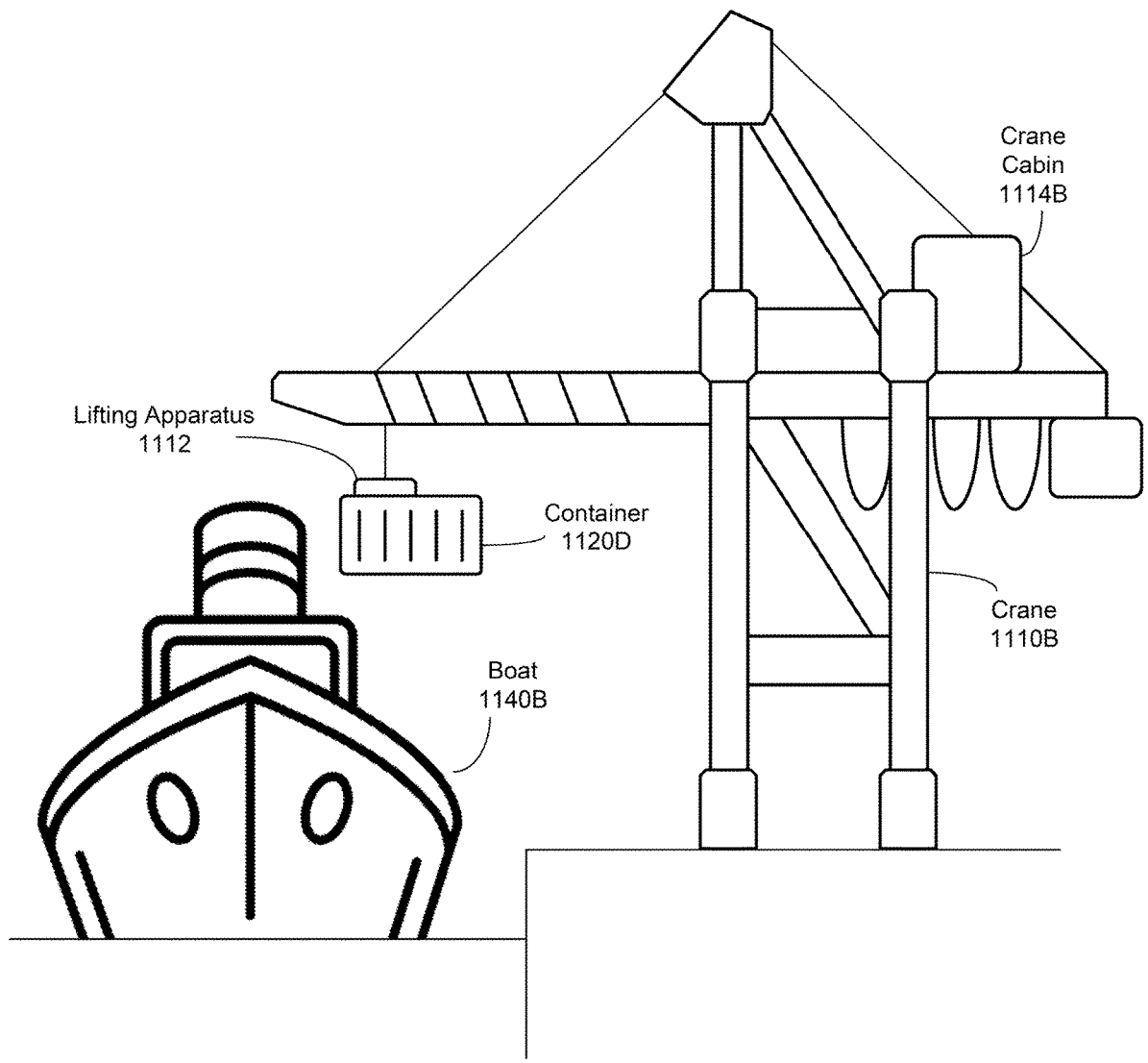

FIGS. 11A-11B show example diagrams of portions 1101, 1102 of a port including cranes 1110, 1110B with lifting apparatuses 1112, 1112B for moving containers 1120, according to some embodiments. The cranes 1110, 1110B and lifting apparatuses 1112, 1112B may be outfitted with one or more scanning tape nodes and long range scanning gateway nodes, according to some embodiments. In the example of FIGS. 11A-11B, containers 1120 may collectively refer to containers 1120A-1120D.

When containers 1120 enter a port on a vehicle or boat 1140, containers 1120 may be moved from the boat 1140 using a crane 1110. A crane 1110 may include a lifting apparatus 1112 which is used to securely hold and move containers 1120. The crane may be a gantry crane, a container crane, a shipping crane, or some other type of crane, according to some embodiments. The lifting apparatus 1112 may be a container frame, a container spreader, or a different apparatus for securing the container to the crane, according to some embodiments.

Seaports and other security checkpoints may have significant size and traffic flow that makes it difficult to prevent every assets that fail the conditions for passage through the checkpoints from making it through the checkpoint. At a security checkpoint, there may be a finite number of choke points where assets and containers must pass through. One example, as shown in FIGS. 11A-11B are the locations on the port, where cranes move containers from ships or vehicles to a dock. In some examples, the cranes also may move containers from a ship or vehicle to another vehicle or ship. Therefore, to check every individual container that is moved off of a ship or vehicle passing through the port for tampering, rejected items, or items that have had their inspection deferred, a scanning gateway or scanning tape node is placed at every crane 1110, 1110B where the containers will flow through, according to some embodiments.

See FIGS. 11A-11C for example of container cranes or gantry cranes that may be used at seaports to transport containers (e.g., sea containers, multi-modal containers, or other containers) from a boat to shore. Container cranes may also be referred to as ship-to-shore containers. As shown in FIGS. 11A and 11C a container crane or gantry crane may include a container lifting frame or spreader that grabs a container when moving the container.

In the disclosed method and system thereof, scanning gateway tape nodes (also referred to herein as "scanning tape nodes") are attached to a lifting apparatus (e.g., a container lifting frame or spreader) of a crane for inspecting each asset container 1120 moved from boats 1140, 1140B to a shore/dock 1130 of a seaport.

Figure 12A:
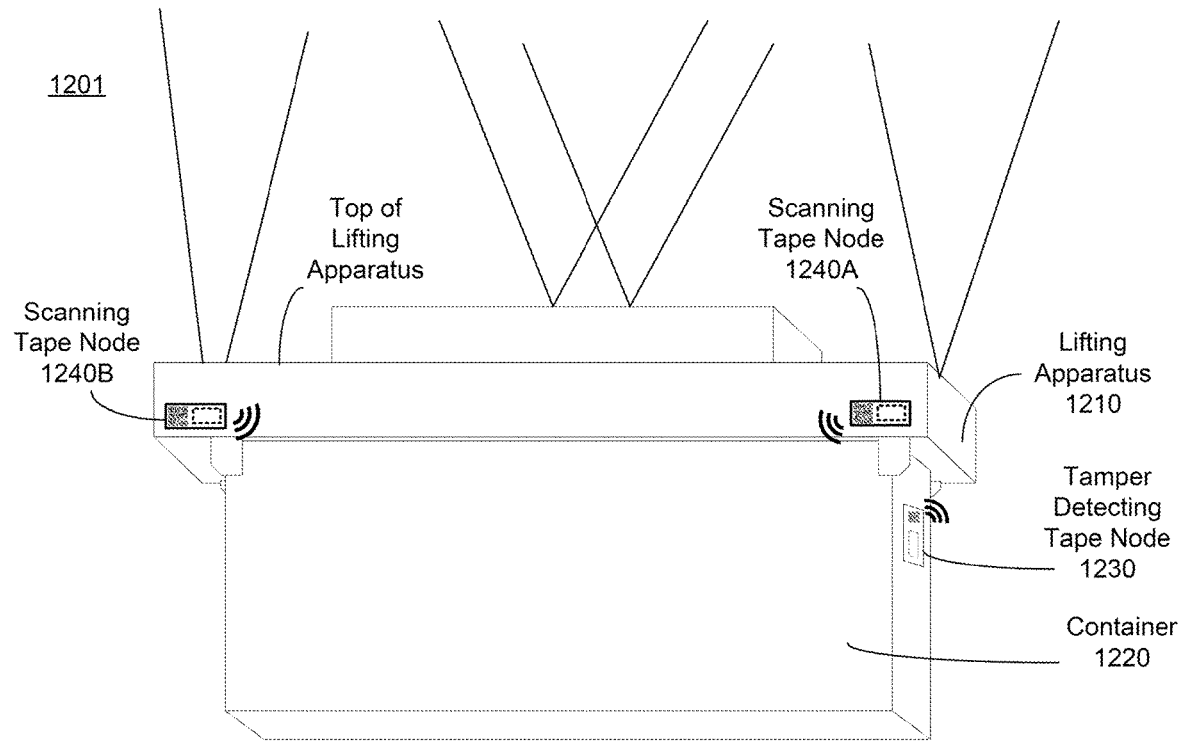
FIGS. 12A-12B are example diagrams of a lifting apparatus of a crane showing the placement of a group of scanning tape nodes on the lifting apparatus for a tamper detection and asset tracking, according to some embodiments.
Figure 12B:
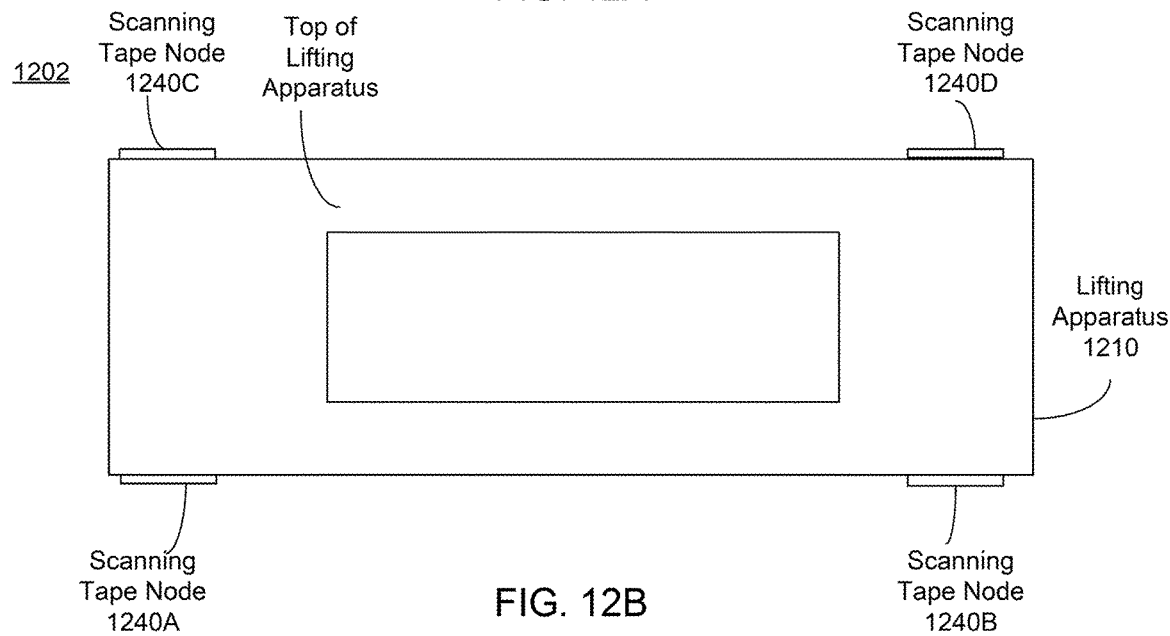

FIGS. 12A-12B are example diagrams of a lifting apparatus of a crane showing the placement of a group of scanning tape nodes on the lifting apparatus for a tamper detection and asset tracking, according to some embodiments. FIG. 12A shows a side view of a container 1220 being lifted by a lifting apparatus 1210 of a crane, according to some embodiments. FIG. 12B shows a top-down view of the lifting apparatus 1210 shown in FIG. 12A, according to some embodiments.

As shown in FIGS. 12A-12B, one or more scanning tape nodes 1240 may be attached to the lifting apparatus 1210 (also referred to herein as a "lifting frame"). Herein, scanning tape nodes 1240 collectively refers to scanning tape nodes 1240A-1240D. In other embodiments, the scanning tape nodes 1240 are attached to a different apparatus or component of a crane that makes contact with the container or asset being moved by the crane. For example, in some embodiments the scanning tape nodes are attached to a claw or other component that is used to secure the container or asset to the crane while the container or asset is being moved.

In the example of FIGS. 12A-12B, 4 scanning tape nodes are attached to the lifting frame, one on each corner of the lifting frame. In other embodiments, different configurations are used, including a different number of scanning tape nodes.

Every crane at the seaport may be equipped with the scanning tape nodes on respective lifting frames. Since there are a limited number of cranes that can be used to move containers from the ships to the shore of the seaport, the system is able to scan every single container that enters the shore of the seaport using the scanning tape nodes, since every container must be moved by one of the cranes.

The scanning tape nodes 1240 are configured to wirelessly communicate with a tamper detecting tape node 1230 attached to a container that is being moved by the crane. A tamper detecting tape node may be attached to every container on a boat that is at the seaport, in some embodiments. See U.S. patent application Ser. No. 17/449,582 for more details on the tamper detecting tape node.

Each of the scanning tape nodes 1240 is an embodiment of an adhesive tape platform, such as the adhesive tape platform shown in FIGS. 1-6C. The tamper detecting system associated with the tamper detecting tape nodes, scanning gateways, and scanning tape nodes is an embodiment of the tracking system 400 shown in FIG. 7.

The tamper detecting tape node 1230 is configured to detect any tampering or tampering events that occur while it is attached to the container. The tamper detecting tape node 1230 is attached to the container before the start off the container's journey and monitors the container for tampering events during the journey. When the tamper detecting tape node 1230 communicates with the scanning tape nodes 1240, the tamper detecting tape node 1230 reports any tamper detecting events to the scanning tape nodes 1240. The tamper detecting tape node 1230 may also transmit any sensor data, location data, event data, and/or other data related to the tampering events to the scanning tape nodes 1240. In some embodiments, if no tampering has occurred to the container, the tamper detecting tape node transmits data corresponding to a no-tampering event, which indicates that no tampering has been detected.

The scanning tape node determines whether the container that is being moved by the crane has experienced tampering, based on the wireless communications with the tamper detecting tape on the container. According to some embodiments, the scanning tape node further determines whether the container needs to be manually inspected based on the wireless communications with the tamper detecting tape on the container. If the scanning tape node determines that tampering has occurred to the container, the scanning tape node may follow up by sending an alert to another wireless node of the system 400.

In some embodiments, the scanning tape node itself is equipped with a cellular communications or satellite communications system. The scanning tape node may use the cellular or satellite communications system to directly update a server and database of the system 400 with the detected tampering events.

In other embodiments, the scanning tape node is equipped with a LoRa or LoRaWAN communications system and communicates with a gateway node in the seaport that also has LoRa or LoRaWAN communication capabilities. The gateway node then updates the server and database of the system 400.

In other embodiments, the scanning tape nodes are equipped with Bluetooth (or BLE) communications system within a communication range of a gateway node with Bluetooth capabilities. The scanning tape node communicates the alerts and tampering data over Bluetooth to the gateway node, and the gateway node updates the server or database of the system 400.

In some embodiments, the scanning tape node communicates the alert via Bluetooth directly to a client device of a nearby human operator (e.g., employee of the seaport operator). For example, the human operator may be a person operating the crane. The human operator is then instructed to take follow up actions, such as marking the container for inspection or performing an inspection themselves.

Both the scanning tape node and the tamper detecting tape node may communicate with each other using Bluetooth communications (or BLE).

In some embodiments, each of the scanning tape nodes includes at least two wireless communication systems including a first and second wireless communication system. The first wireless communication system may be a low range wireless communication system, such as Bluetooth or BLE. The second wireless communication system may be a longer range wireless communication system, such as LoRa or LoRaWAN. In some embodiments, the second wireless communication system has a range that is larger than a range of the first wireless communication system.

In some embodiments, one or more of the scanning tape nodes 1240 on the lifting frame 1210 of the crane enter a high accuracy scanning mode. In the high accuracy scanning mode, a higher level of power consumption may occur than in a normal or low power mode. This may be the result of performing more frequent wireless communications or from increasing an output signal strength from one or more wireless communication signals. In some embodiments, one or more sensors on the scanning tape node are activated and collect data at a high sampling rate in the high accuracy mode. The high sampling rate may be higher than a sampling rate in a normal or low power mode, for example. In further embodiments, sensors that are deactivated during a normal or low power mode are activated and used to collect sensor data in the high accuracy scanning mode. The high accuracy scanning mode may include multiple tiers, each tier including a different set of functions and configurations for the scanning tape node.

The high accuracy scanning mode for a scanning tape node may be activated in order to communicate with one or more tape nodes or wireless communication device inside of the container. The high accuracy scanning mode may include setting an output signal strength to a level that corresponds to the electromagnetic waves of the wireless communication (e.g., Bluetooth transmissions) penetrating the exterior of the container and reaching one or more wireless nodes inside of the container. In some embodiments, the high accuracy scanning mode is activated in response to the tamper detecting tape node 1230 reporting one or more tampering events to the scanning tape nodes 1240, the one or more tampering events corresponding to predetermined types of tampering events that are stored on the scanning tape nodes. For example, the scanning tape nodes may enter the high accuracy scanning mode in response to receiving tampering event data that indicates that the container has been drilled into or unlocked during a journey prior to being moved by the lifting frame 1210.

The wireless nodes in the container may include one or more asset tape nodes attached to individual assets contained in the asset container. The one or more asset tape nodes attached to individual assets may be used to track the individual assets and detect tampering with the assets.

In some embodiments, in the high accuracy scanning mode the scanning tape node transmits instructions to the tape nodes inside of the container to increase the output signal strength of their respective wireless communication system or set the output signal strength to a specified level. The set output signal strength for the tape nodes inside of the container may correspond to a level needed to penetrate the exterior of the container. This may correspond to a respective high accuracy scan mode of the tape nodes inside of the container being activated.

In many cases, the container naturally forms a faraday cage that blocks electromagnetic radiation from penetrating or escaping the container. The system enables communication between the tape nodes inside the container and the scanning tape node on the lifting frame by using the high accuracy scanning mode.

In other embodiments, one or more scanning tape nodes instructs the tamper detecting tape node on the container to enter the high accuracy scanning mode, and the tamper detecting tape node communicates with the tape nodes inside of the container, instead of the scanning tape nodes. The tamper detecting tape node then relays data received from the tape nodes inside the container to the scanning tape nodes.

In the high accuracy scanning mode, the one or more scanning tape nodes 1240 may request and receive data from the tape nodes inside the container. The received data may include an identifier of the tape node, an identifier of an associated asset, a destination for the associated asset, a point of origin for the associated asset, location data tracked for the associated asset, a weight of the associated asset, a size of the associated asset, a type of asset, a risk factor for the associated asset, a request for inspection for the associated asset, an alert related to the asset being tampered with or otherwise compromised, sensor data from the tape node, or some other data from the tape node.

In some embodiments, every asset inside the container includes a tape node that tracks the respective asset. The high accuracy scanning mode allows the scanning tape node to communicate with each tape node inside the container, and check to make sure that all of the assets that are supposed to be inside the container are still there. The scanning tape node may catalog which tape nodes and associated assets are inside the container, based on the data received during the activation of the high accuracy scanning mode. The scanning tape node may then compare the cataloged assets to a manifest of expected assets inside the container. The scanning tape node may receive the manifest from the tamper detecting tape node or from another wireless node of the system 400.

In some embodiments, the scanning tape node activates the high accuracy scanning mode for itself or for another tape node (e.g., the tamper detecting tape node), in response to determining that a high probability of tampering exists for the container. This determination may be based on data or reports of tampering events received from the tamper detecting tape node, according to some embodiments.

The high accuracy scanning mode may consume a higher amount of electrical power than the normal or low power mode of the scanning tape node, tamper detecting tape node, or tape node inside the container. In some embodiments, the high accuracy scanning mode is configured to stay activated for a limited amount of time. In other embodiments, the high accuracy scanning mode is automatically disabled after the scanning tape node confirms it has communicated with every tape node inside the container. In other embodiments, the high accuracy scanning mode is manually activated and deactivated by a user based on interactions the user performs with an app or website of a client device.

Figure 14:
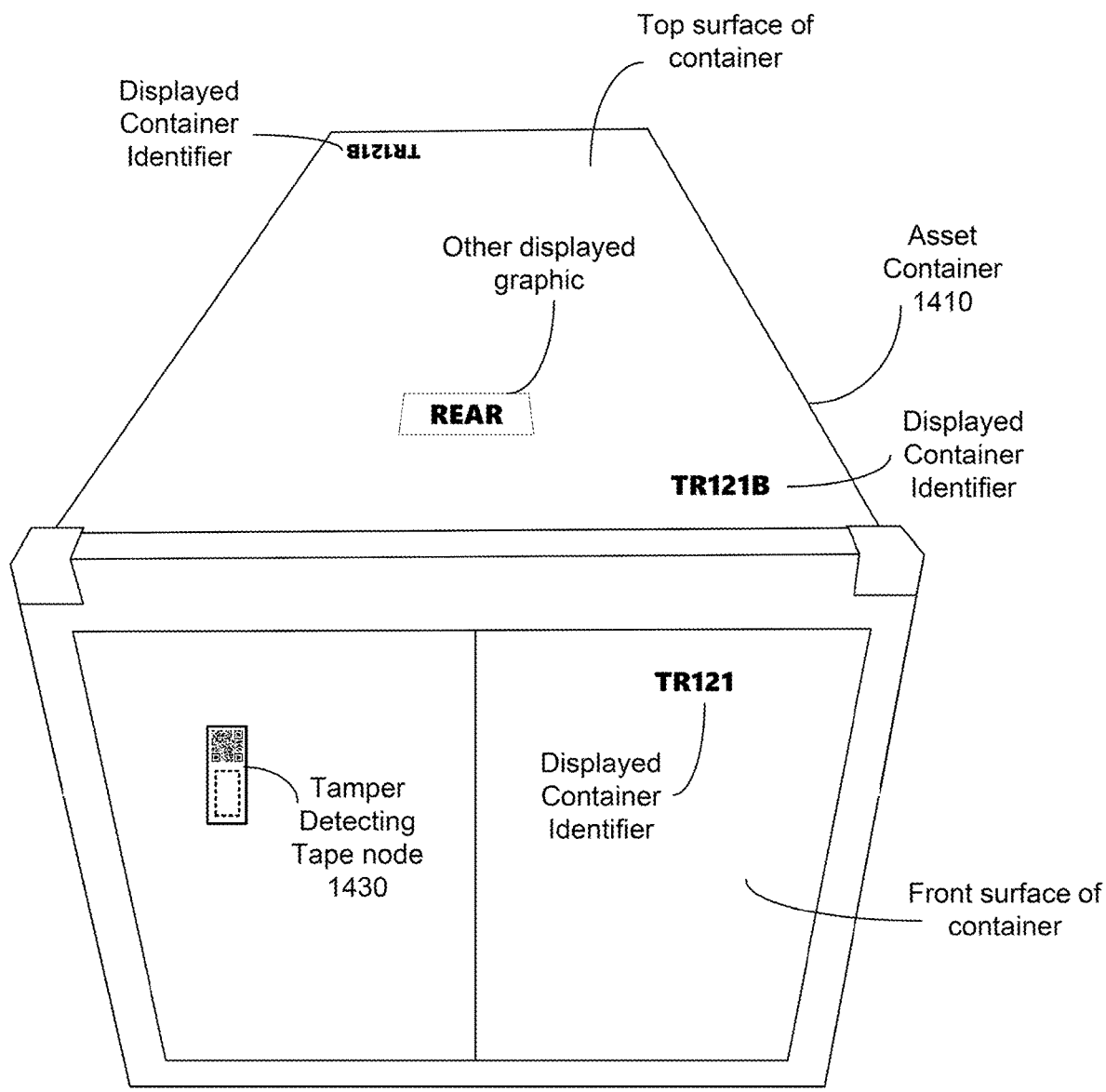
FIG. 14 is an example diagram showing a point of view in a video or photograph of a container by the integrated camera module of the camera node shown in FIG. 13 for detecting the container identifier displayed on the container, according to some embodiments.

A container may include a container identifier displayed on the top of the container. For example, the container identifier may be painted or printed on a portion of the container. An example is shown in FIG. 14, according to some embodiments. The container identifier may be an alphanumeric string, in some embodiments. The container identifier may be a unique identifier or a globally unique identifier, in some embodiments. The identifier may be printed or displayed on the top of the container by a manufacturer of the container, for example.

Figure 13:
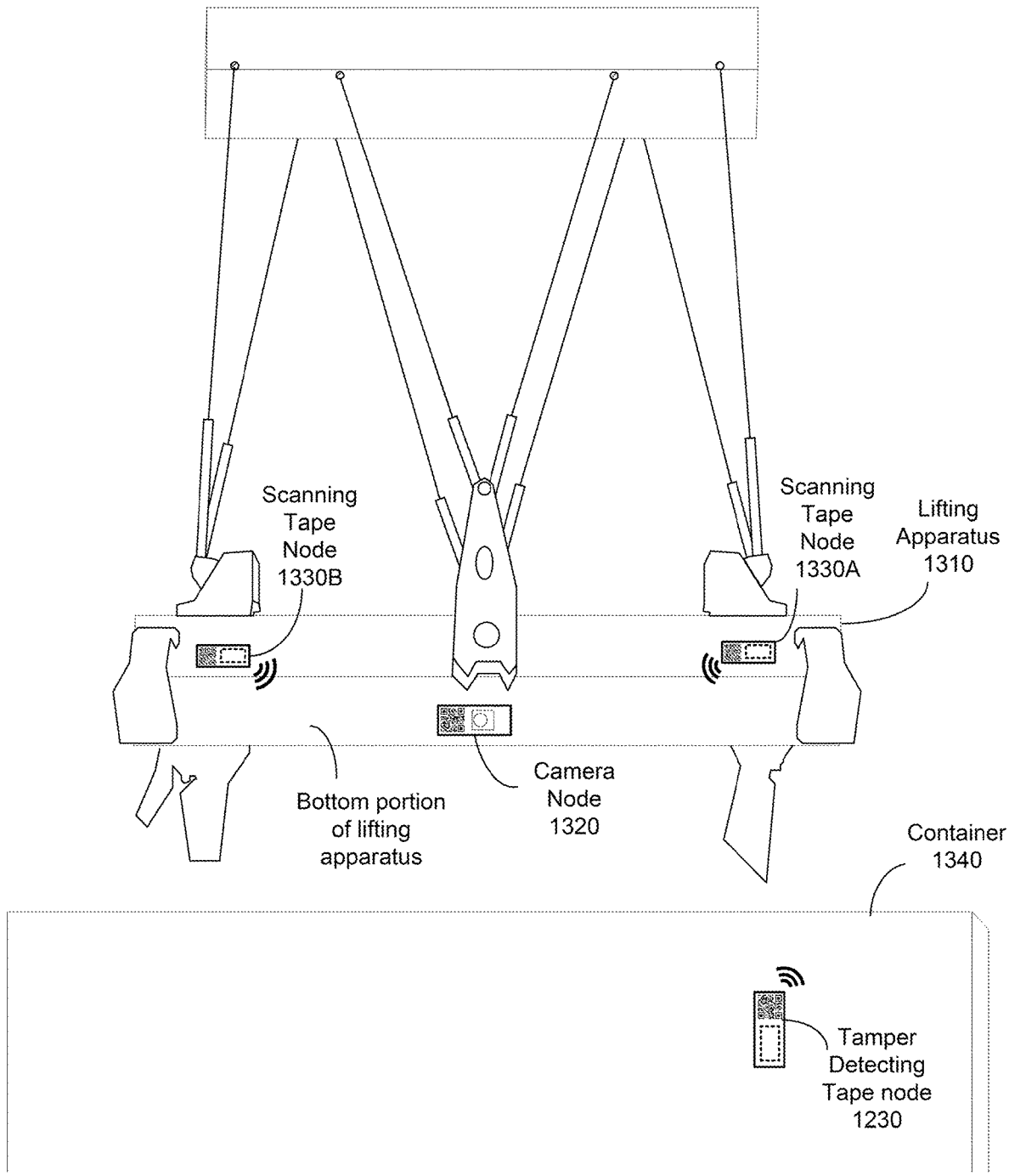
FIG. 13 is an example diagram showing a placement of a camera node including an integrated camera module on a lifting apparatus of a crane for scanning an identifier on a top of a container that will be lifted or moved by the crane, according to some embodiments.

FIG. 13 is an example diagram showing a placement of a camera node including an integrated camera module on a lifting apparatus of a crane for scanning an identifier on a top of a container that will be lifted or moved by the crane, according to some embodiments.

FIG. 13 shows a system for scanning the container identifier using a camera node 1320 attached to the lifting frame 1310 of a crane, according to some embodiments. The camera node is attached to a portion of the lifting frame (i.e., container lifting frame or spreader) and is oriented to point downwards at the top of the container 13140 when the lifting frame is moved over the container (e.g., as it is positioned to grab the container and move it). In other embodiments, the camera node may be oriented with its camera to face a side surface of the container when the lifting frame 1310 is moved near the container. The camera is configured to capture an image or a video of the top of the container. The image or video is then analyzed using standard computer vision or text scanning techniques to determine the identifier based on the image or video. Since the identifier may have a predetermined format, the analysis of the identifier may be made more accurate using this knowledge.

In some embodiments like the example shown in FIG. 13, the camera is integrated into a wireless communication device, such as a tape node. The example of FIG. 13 includes a tape node integrated with the camera (also referred to herein as the "camera node") that is used to scan the container identifier as the crane moves the container. FIG. 14 is an example diagram showing a point of view in a video or photograph of a container by the integrated camera module of the camera node shown in FIG. 13 for detecting the container identifier displayed on the container, according to some embodiments.

The camera node may perform the image analysis locally using a processor and memory of the camera node, in some embodiments. The camera node may determine the container identifier and report the container identifier wirelessly to another node of the system 400, such as one of the scanning tape nodes or a nearby gateway node. The recipient of the report may update (directly or indirectly) the server or database of the system 400 based on the received report. Alternatively, the camera node may include wireless communication systems that allow it to directly update a server or database itself.

In other embodiments, the camera node transmits the captured image or video of the top of the container to a nearby wireless node of the system 400. The nearby wireless node may relay the received image or video to the server or database of the system 400, in some embodiments. In some embodiments, the nearby wireless node is one or more of the scanning tape nodes 1330A, 1330B on the lifting frame 1310. The server or database performs the image analysis for determining the container's identifier based on the image or video, in some embodiments. In alternate embodiments, the nearby wireless node (which may be a tape node, a gateway node, or a client device such as a smartphone) itself performs the image analysis and determines the identifier of the container based on the image or video. The nearby wireless node then reports the determined identifier to other nodes of the system 400 and may also update the server or database of the system. Each of the tape nodes on or inside the container may store the determined container identifier received from the camera node or another node of the wireless system and an association with the container.

Data received from wireless nodes on or inside the container may then be associated with the determined container identifier by the system 400. This may be useful if a human operator is searching for an asset associated with a wireless node contained inside the container. The human operator may receive the determined container identifier associated with the asset he or she is looking for via a client device app, website, e-mail, SMS, or other methods, which allows the human operator to locate which container contains the asset. In some embodiments, the location of the container is tracked, and the human operator is guided to the location of the container associated with the asset using a client device app, website, or web app. For example, the container may have a tamper detecting tape attached to it which is used by the system 400 to track the location of the container.

In some embodiments, rejected assets being held inside a container are associated with a container identifier detected using the camera node 1320. Items that go through inspection at a checkpoint (e.g., a border protection checkpoint) may be rejected for entry through the checkpoint and other checkpoints. The rejected items may have a tape node attached to it that denotes the item as rejected. The tape node, in some embodiments, may have a graphic or text displayed on the tape node that indicates that the item is rejected. The tape node is configured to communicate the rejected status to other wireless nodes of the system 400, when communicating with the other wireless nodes. Further details on blacklisting rejected items are discussed in U.S. Non-provisional patent application Ser. No. 17/449,582, filed Sep. 30, 2021, which is hereby incorporated in its entirety.

One issue for border protection and security is detecting the rejected item when it has been moved into another container, vehicle, or boat. Additionally, determining the new container and the location of the new container is important for locating the rejected item quickly for holding or disposal. Using the camera node and system disclosed above, when a rejected item is detected by a scanning tape node communicating with the rejected item's tape node, the system uses the container identifier determined using images or video captured by the camera node to determine a container associated with the rejected item. The associated container may be reported to a human operator (e.g., a border protection agent), via a client device associated with the human operator In some embodiments, the camera node is activated in response to a scanning tape node detecting that there is a rejected item inside the container that the crane is moving (see FIG. 13). The system associates the determined container identifier and the tape node's identifier that is associated with the rejected item. The system may store the association in the server or database of the system 400. A human operator may be guided to the container, as described above.

Figure 15A:
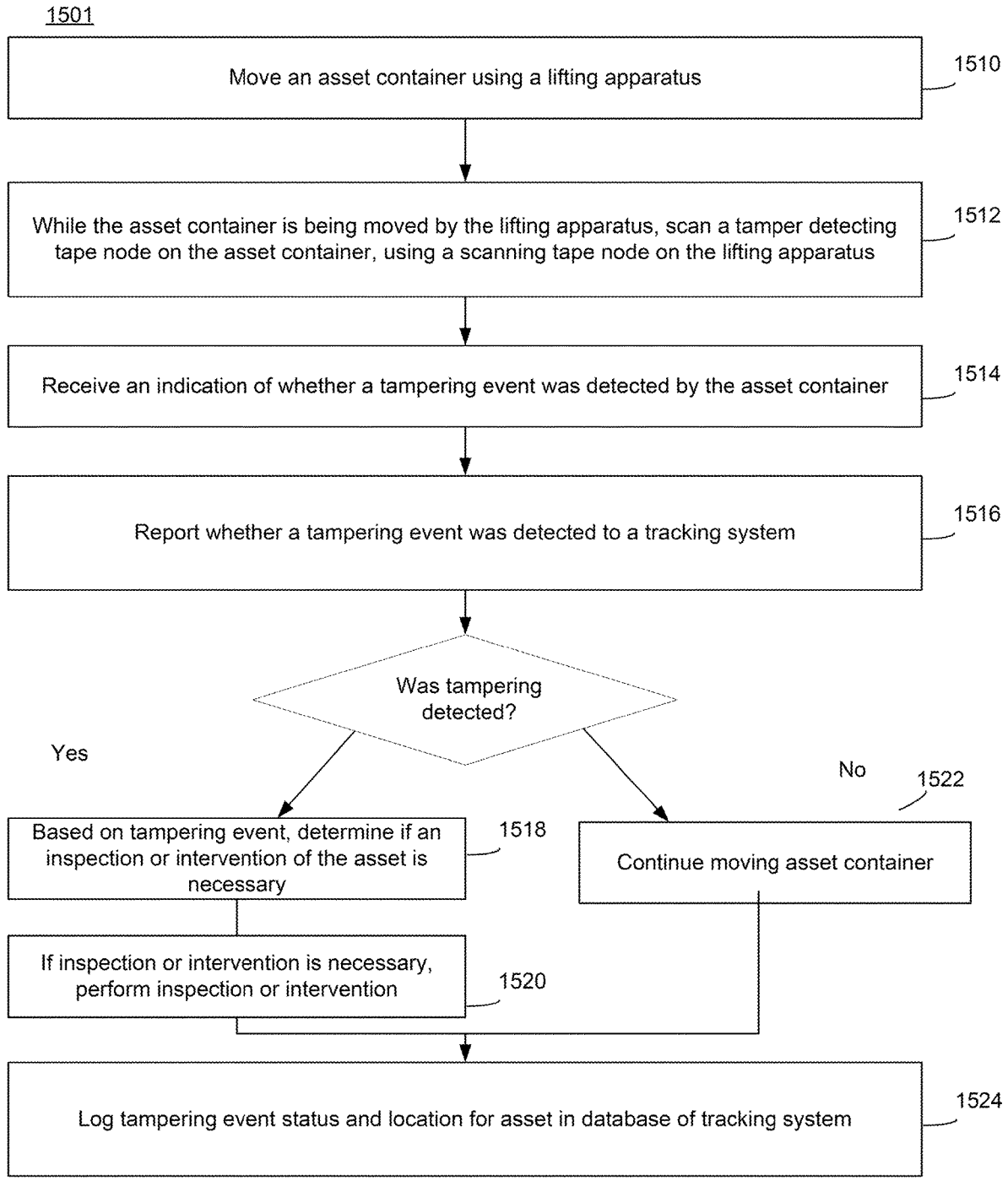
FIGS. 15A-15B are flow chart diagrams for methods of using scanning tape nodes on a lifting apparatus to detect tampering and perform asset tracking, according to some embodiments.
Figure 15B:
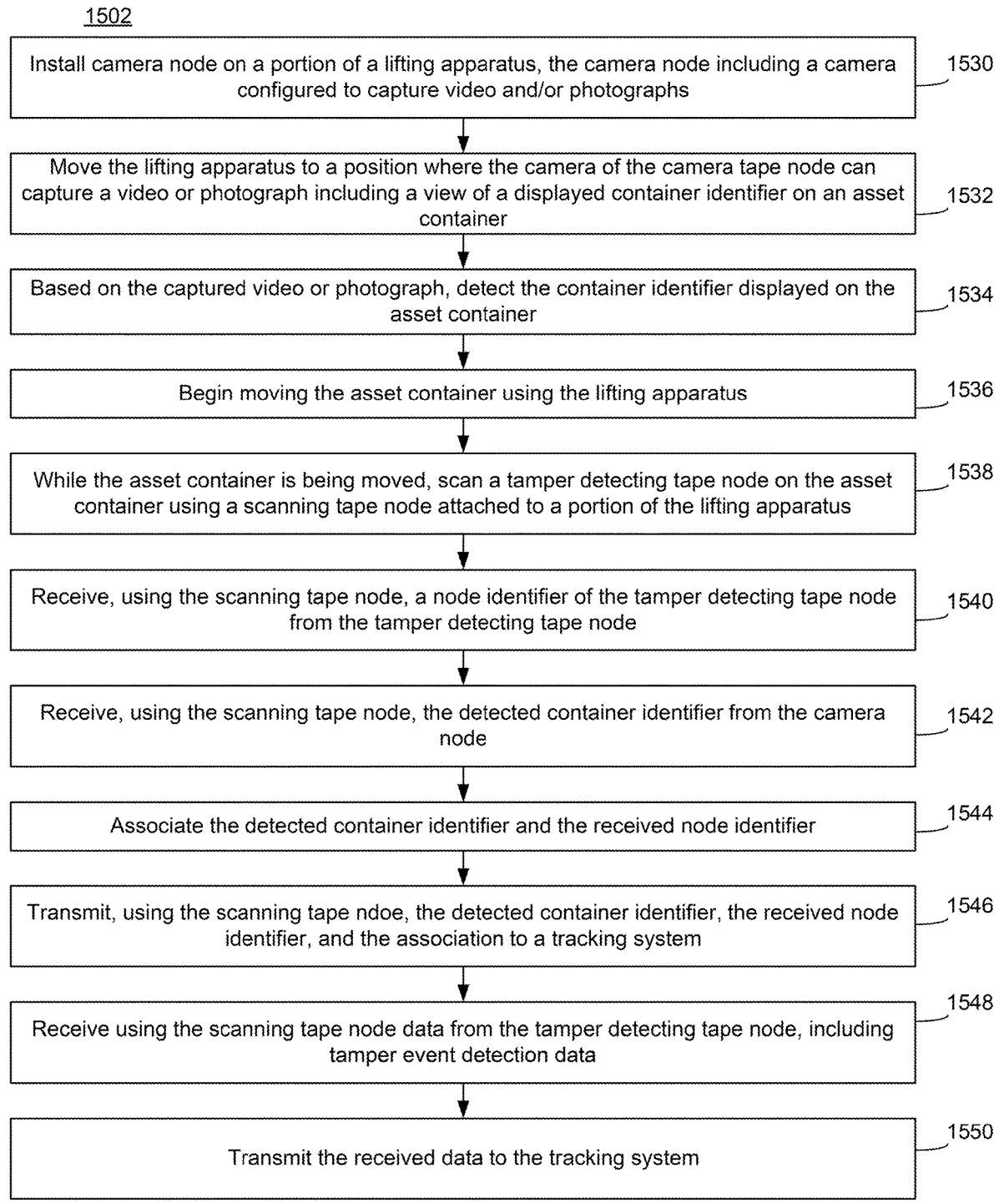

FIGS. 15A-15B are flow chart diagrams for methods of using scanning tape nodes on a lifting apparatus to detect tampering and perform asset tracking, according to some embodiments.

FIG. 15A shows a method 1501 for detecting tampering using the scanning tape nodes. The method includes moving 1510 an asset container using a lifting apparatus. While the asset container is being moved by the lifting apparatus, scan 1512 a tamper detecting tape node on the asset container, using a scanning tape node on the lifting apparatus. Receive 1514 an indication of whether a tampering event was detected by the asset container. Then, the scanning tape node reports whether a tampering event was detected to an associated tracking system 1516.

If tampering was detected by the tamper detecting tap node, based on the tampering event detected, it is determined 1518 if an inspection or intervention of the asset is necessary. If inspection or intervention is necessary, an inspection or intervention is performed 1520. The tampering event status and location for asset is then logged 1524 in database of tracking system.

If tampering was not detected, the lifting frame continues to move 1522 the asset container. The tampering event status and location for asset is then logged 1524 in database of tracking system.

FIG. 15B shows a method 1502 for detecting tampering using the scanning tape nodes including detecting a container identifier displayed on the container. The method 1502 includes the following steps. Install 1530 camera node on a portion of a lifting apparatus, the camera node including a camera configured to capture video and/or photographs. Move 1532 the lifting apparatus to a position where the camera of the camera tape node can capture a video or photograph including a view of a displayed container identifier on an asset container.

Based on the captured video or photograph, detect 1534 the container identifier displayed on the asset container. Begin moving 1536 the asset container using the lifting apparatus. While the asset container is being moved, scan 1538 a tamper detecting tape node on the asset container using a scanning tape node attached to a portion of the lifting apparatus. Receive 1540, using the scanning tape node, a node identifier of the tamper detecting tape node from the tamper detecting tape node. Receive 1542, using the scanning tape node, the detected container identifier from the camera node.

Associate 1544 the detected container identifier and the received node identifier. Receive 1546 using the scanning tape node data from the tamper detecting tape node, including tamper event detection data. Transmit 1548 the received data to the tracking system 400.

Dynamically Assigning Roles to Extend Collective Battery Life of a Group of Wireless Nodes If a single tape node is used to perform a task or fulfill a role in the IOT system, the operational lifetime of the single tape node is limited to the single tape node's battery life. An install life is defined herein as the amount of time that a task or role can be fulfilled by an IOT system before a new installation of IOT devices (e.g., tracking devices or tape nodes) is necessary to continue having the task or role fulfilled. The install life of a single tape node performing a task or role is based on the battery life of the single tape node.

In the disclosed method and system thereof, the install life for performing a task or role is extended by using a group of tape nodes (e.g., 4 tape nodes) that are installed within proximity to each other, instead of a single tape node. FIGS. 16A-16E are example diagrams showing different phases during the operational lifetime of a group of tape nodes 1610 (including Tape Node A, Tape Node B, and Tape Node C) that dynamically allocate hierarchical roles to extend the collective battery life of the group of tape nodes, according to some embodiments.

The group of tape nodes collaborate with each other to perform an assigned task or role. Each of the tape nodes in the group is dynamically allocated a hierarchical role based on a remaining battery energy level of the respective tape node. The install life for the assigned task or role is then based on a sum of the battery life of the tape nodes in the group. In some embodiments, the tape nodes are installed within a threshold distance from each other. The threshold distance may be based on a wireless communication range of the tape nodes. For example, the tape nodes in the group may all be installed within a communication range for Bluetooth or Bluetooth Low Energy (BLE) communications. The tape nodes may be installed within a 100*m* of each other, for example.

The group includes a group role which includes all functions, activities, tasks, and responsibilities in the IOT system 400 that are assigned to the group by a server or controller of the IOT system 400. For example, the group of tape nodes may include three tape nodes installed on the lifting frame of the crane shown in FIG. 12, and the group role may be to scan every container that is moved by the crane for tamper detection. The three tape nodes are also shown in the interaction diagrams of FIGS. 16A-16D. The three tape nodes collaborate and share data for performing the group role. The tape nodes in the group may share data over a battery efficient wireless communication connection (e.g., BLE). Thus, instead of a single tape node performing all of the tasks necessary for the group role, the tasks are distributed between the three tape nodes. This extends the battery life of all three tape nodes, by requiring each tape node to perform less battery-consuming activities than a tape node individually performing all of the tasks for the group role.

The group collaborates and determines a tape node to become a first local master role at the time of installation and initialization of the tape nodes in the group. The tape nodes may report their remaining battery life to each other and assign the tape node with the most remaining battery life the local master role, according to some embodiments. The local master role is a role that requires the most frequent activity and power consumption. The other tape nodes are assigned the local secondary role. The local secondary role requires less overall or average power consumption than the local master role. The passive secondary nodes (tape nodes with the local secondary role) also rely on the active master node (tape nodes with the local master role) for instructions and configuration and report data back to the active master node. The active master nodes assigns functions to the passive secondary nodes and requests data from each of the passive secondary nodes as is required to complete functions integral to the group role. The passive secondary nodes may enter a sleep mode, at times when the active master node does not require the passive secondary nodes to perform a function or wirelessly communicate on behalf of the active master node. The passive secondary nodes may perform wireless communications less frequently than the active master node, in some embodiments.

Figure 16A:
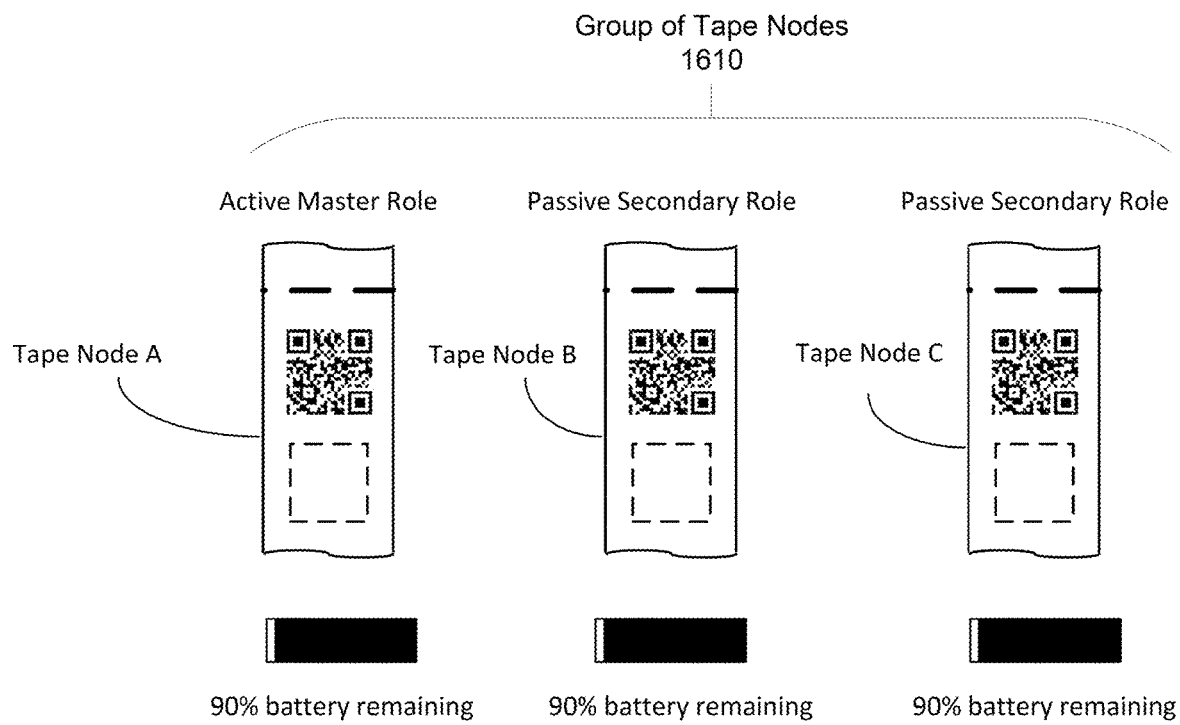
FIGS. 16A-16E are example diagrams showing different phases during the operational lifetime of a group of tape nodes that dynamically allocate hierarchical roles to extend the collective battery life of the group of tape nodes, according to some embodiments.
Figure 16B:
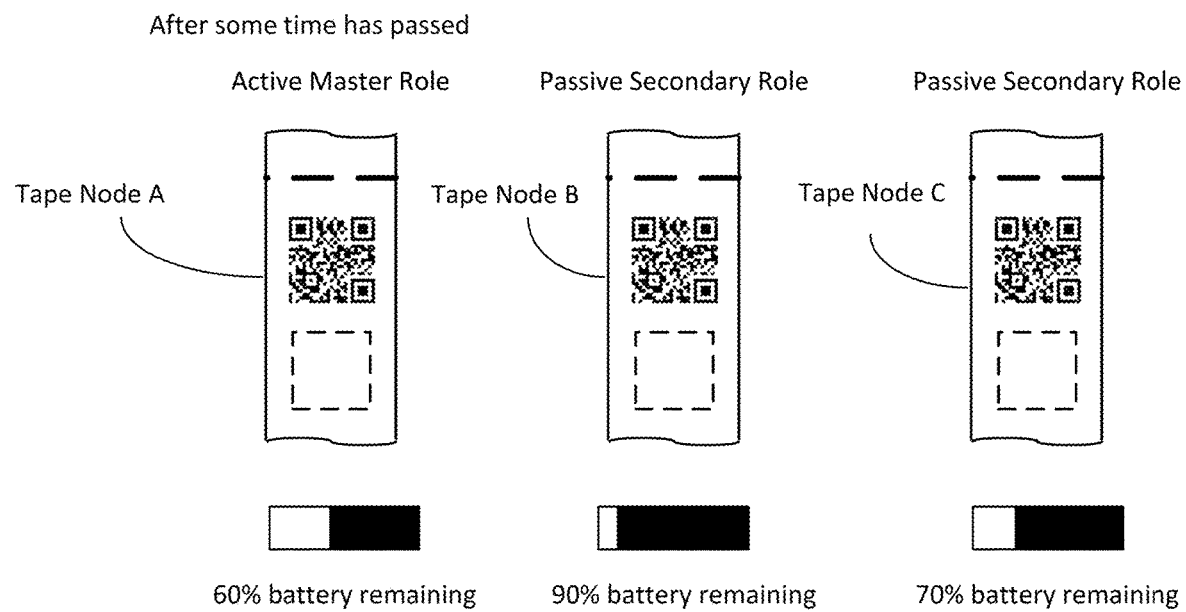
Figure 16C:
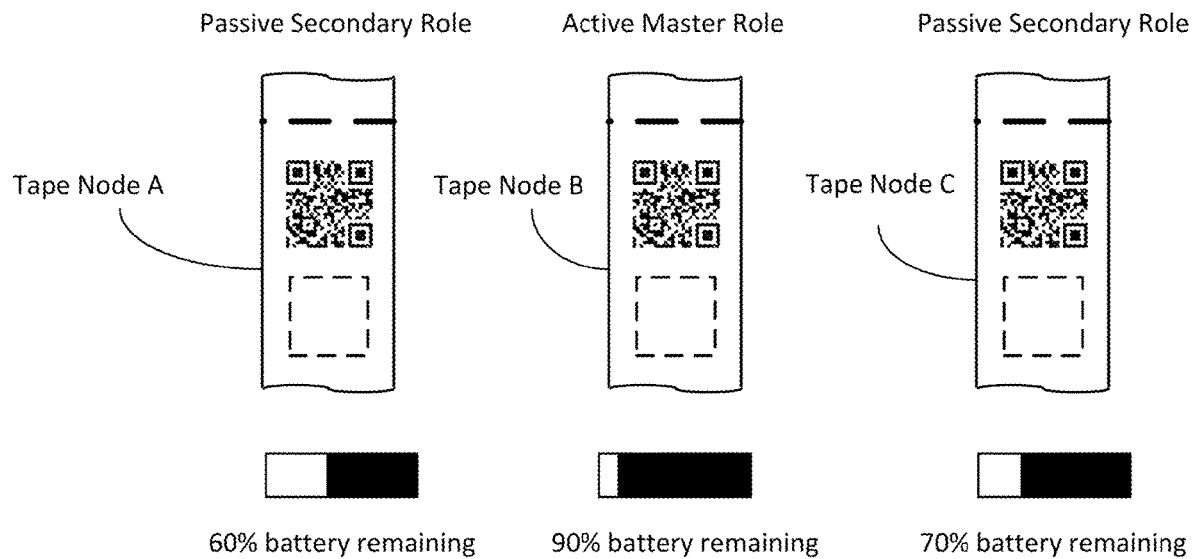

In the example of FIGS. 16A-16D, the first tape node to be assigned the local master role is the tape node A. The remaining battery energy level for each of the tape nodes (tape node A, B, and C) is shown in FIGS. 16A-16D, for each phase of the illustrated process. The Tape node A acts as the active master node until its remaining battery energy reaches a first threshold level. The first threshold level in the example of FIG. 16B is 60% of its battery capacity. In response to being at or below the first threshold level, the tape node A assigns tape node B to take over the local master role, based on the tape node B having the highest remaining battery energy among the three tape nodes. The tape node B becomes the second active master, and the tape node A assumes a local secondary role, as shown in FIG. 16C. The tape node B then redistributes tasks and configurations to tape nodes A and C according to the new configuration of master and secondary roles in the group.

Figure 16D:
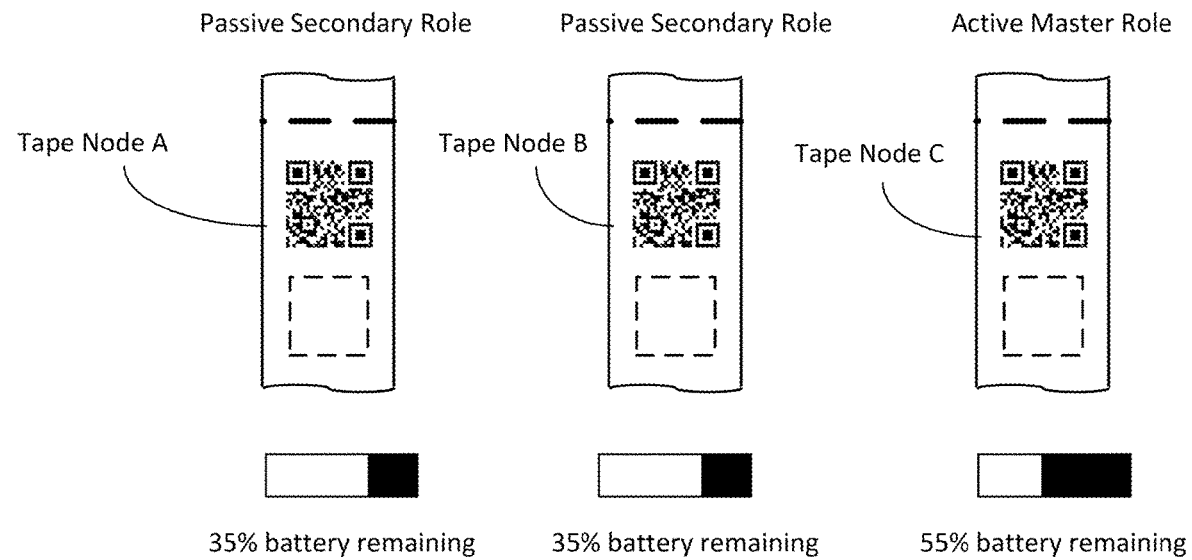

The tape node B operates as the local master role until its remaining battery energy reaches or falls below a second threshold level. In the example of FIG. 16D, the second threshold level is 35%. The tape node B then assigns the next local master role to be assigned to the tape node with the highest remaining battery energy, e.g., tape node C. Tape node C then assumes the local master role, and tape node B becomes a passive secondary node. Tape node C then redistributes the tasks and configuration to tape nodes A and B according to the new configuration of master and save roles in the group.

The group continues this process with subsequent threshold levels (e.g., third and fourth threshold levels). Each time the current active master node's battery energy reaches or falls below a subsequent threshold level, the local master role is handed off to another tape node of the group. During this process, additional tape nodes may be added to the group, according to some embodiments. This may be done to replenish or increase the sum battery energy of the group. Tape nodes that have a low battery level or are already powered off due to depleting their batteries may be removed from the group.

By having one tape node of the group assume an local master role that requires higher battery consumption, the battery energy of the passive secondary nodes are each conserved. Handing off of the local master role allows for the optimization of the group's collective battery energy and extends the install life of the group performing the group role.

In some embodiments, the first threshold battery level for assigning a new master node among the group of tape nodes, is a low battery level associated with the current master node's battery being nearly depleted. In these embodiments, the current master node remains the master node among the group of tape nodes until it is about to have a depleted battery. The current master node then assigns one of the tape node's among the passive slape nodes in the group to take over the master node role, and afterwards the former master node deactivates or powers down. The group then operates with one less tape node. The new master node redistributes the tasks for performing the group's role and reconfigures the tape nodes with the local secondary role to accommodate having one less tape node in the group. The new master node may similarly continue functioning according to the active master node role until its battery level is at or below the first threshold battery level. The new master node then repeats the master node handoff process, assigning one of the remaining passive secondary nodes the role of the new master node of the group, before deactivating and powering off. This may repeat until there is only one tape node left in the group that is not deactivated and powered off. At this point, the remaining tape node becomes the new master node of the group and alerts the system 400 to issue instruction for the installation of new tape nodes, in proximity to the last remaining master node, to be added to the group. Thus, the install life of the group may be extended compared to conventional methods, and the group can be replenished with new tape nodes that have full batteries without extensive down time for the group.

Figure 16E:
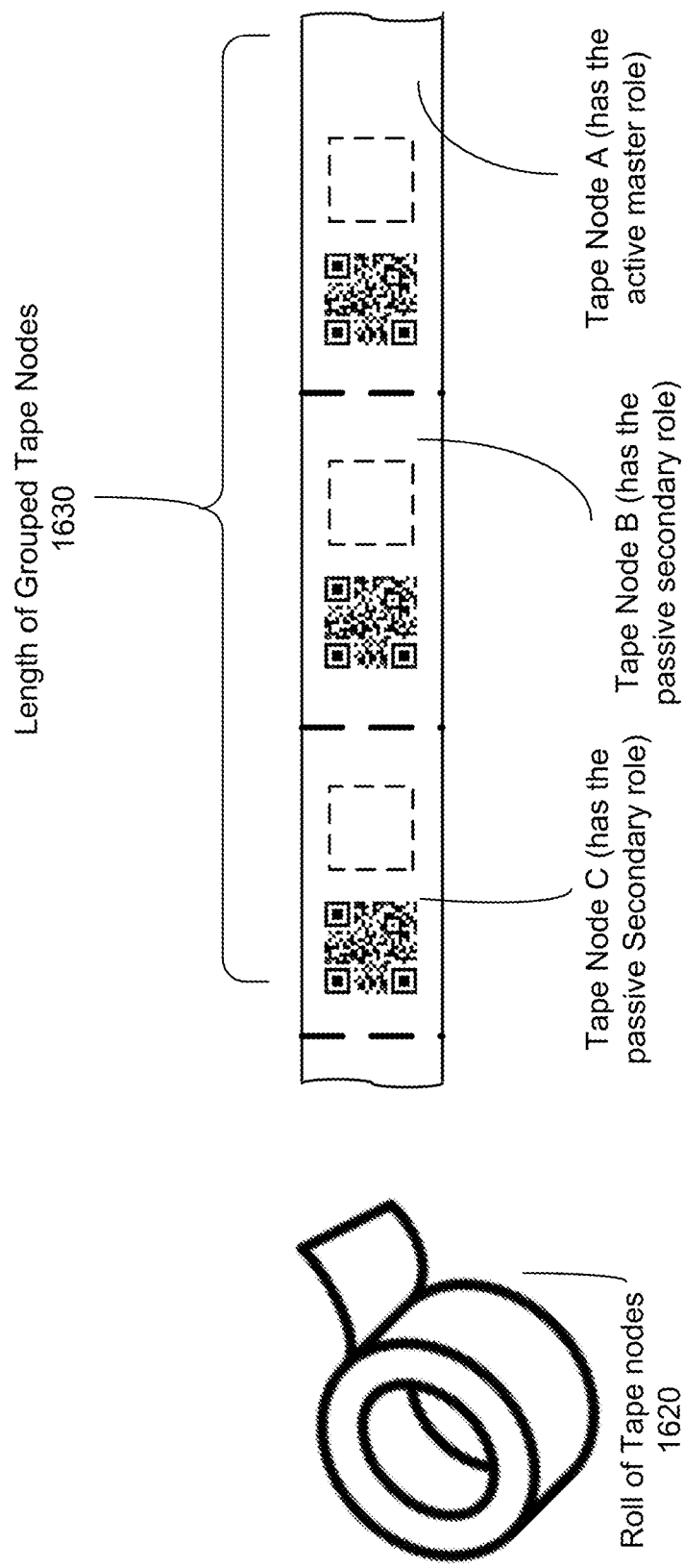

FIG. 16E shows a length 1630 of an adhesive tape platform that includes 3 grouped tape nodes, each tape node corresponding to a segment of the length, according to some embodiments. Tape nodes may be initialized and distributed from a role or strip of adhesive tape platform nodes, based on desired operational lifetime. If a user wants an operation lifetime corresponding to roughly 3 times an operational lifetime of an individual tape node, the user may cut or separate a length corresponding to 3 segments or nodes from a roll or strip 1620 but doesn't separate the individual tape nodes from each other.

The first tape segment, Tape Node A activates from being cut. Tape Node A Automatically becomes the active master node. Next 2 segments on the length of the tape assume the local secondary role upon detecting they are still attached to Tape Node A. In some embodiments, at the time of activation each tape node checks to see if there's an adjacent tape attached to itself which is not activated. If so, each tape node activates the adjacent tape node that is attached. The strip or roll of tape nodes may include a bus that runs through the tape roll or strip, which allows tape nodes attached to each other on a segment to communicate to each other. In this case, the activation signal may be transmitted along to an adjacent tape nodes via the bus or passthrough. The adjacent tape node activates and powers on in response.

The adjacent tape node performs the same process, going down the strip. If the current tape node does not have a next adjacent tape node when it is activated, the current tape node may then report this to the attached tape nodes. The tape nodes that are attached to each other (i.e., part of a single segment) associate with each other as a group and receive a group role from a wireless node of the system 400. In some embodiments, the tape nodes of the group determine a group identifier and store the group identifier on each of the tape nodes.

In other embodiments, instead of a wired bus that connects the tape nodes, wireless communication is used to activate adjacent tape nodes (i.e., tape node B and Tape Node C) when the length 1630 is activated and initialized.

In other embodiments, all the tape nodes in the group 1630 operate with the local master role. The master nodes of the group still collaborate and distribute tasks amongst themselves in order to fulfill the group role. The master nodes of the group may assign tasks to each individual tape node of the group based on remaining battery for the respective individual tape node. In further embodiments, each of the tape nodes operates with a frequency of communication that is lower than a normal operational mode for an individual tape node completing the same group role. In an example, if the group role for a group of four tape nodes (each having an active master tape role) requires that the group establish a cellular communication connection every hour, the four active master tape nodes of the group may be configured to each perform a cellular communication connection once every four hour. The group may choose a different master tape node to perform the cellular communication every hour cycling through the four master tape nodes, with one of the active master tape nodes from the group performing the cellular communication every hour. Thus, each master tape node only performs the cellular communication connection every four hours. In contrast, if a single tape node was used to fulfill the same group role, the single tape node would need to perform the cellular communication every hour. This would result in a dramatically reduced install life for the single tape node, compared to the group of four fulfilling the same role together.

Figure 17:
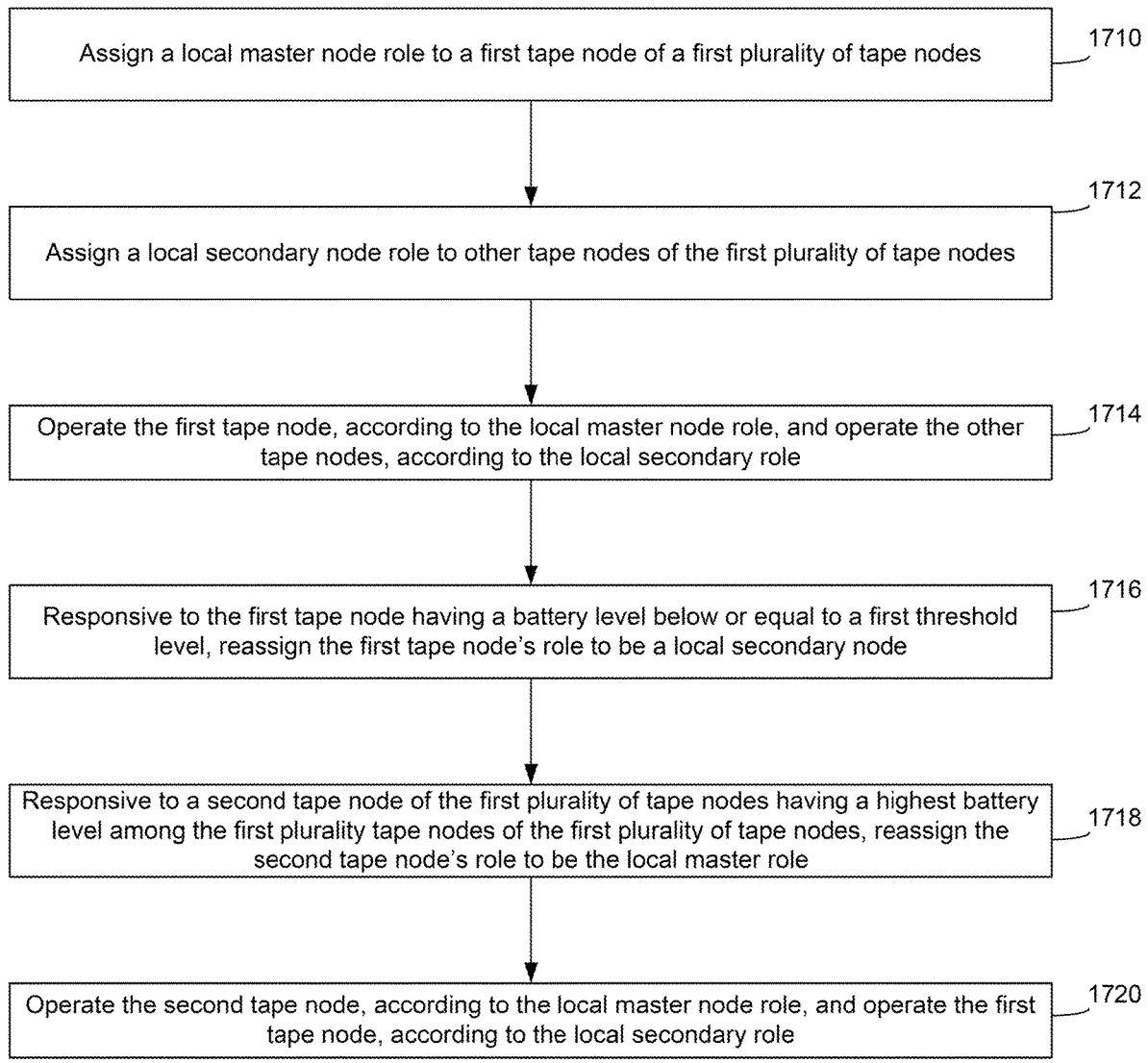
FIG. 17 is a flow chart diagram for a method of dynamically allocating hierarchical roles for a group of tape nodes to extend the collective battery life of the group of tape nodes, according to some embodiments.

FIG. 17 is a flow chart diagram for a method 1701 of dynamically allocating hierarchical roles for a group of tape nodes to extend the collective battery life of the group of tape nodes, according to some embodiments.

The method 1701 includes assigning 1710 a local master node role to a first tape node of a first plurality of tape nodes. A local secondary node role is then assigned 1712 to other tape nodes of the first plurality of tape nodes. The first tape node is operated 1714 according to the local master node role, and the other tape nodes are operated 1714 according to the local secondary role Responsive to the first tape node having a battery level below or equal to a first threshold level, the first tape node's role is reassigned 1716 to be a local secondary node. The reassignment may be performed by the first tape node itself, upon detecting the low battery level. Responsive to a second tape node of the first plurality of tape nodes having a highest battery level among the first plurality tape nodes of the first plurality of tape nodes, the second tape node's role is reassigned 1718 to be the local master role. The reassigning may occur based on the plurality of tape nodes communicating with each other or communicating with the first tape node to detect which of the plurality of tape nodes has the highest battery level. The plurality of tape nodes as a group or the first tape node then reassigns 1718 the local master node role to the second tape node.

Figure 18:
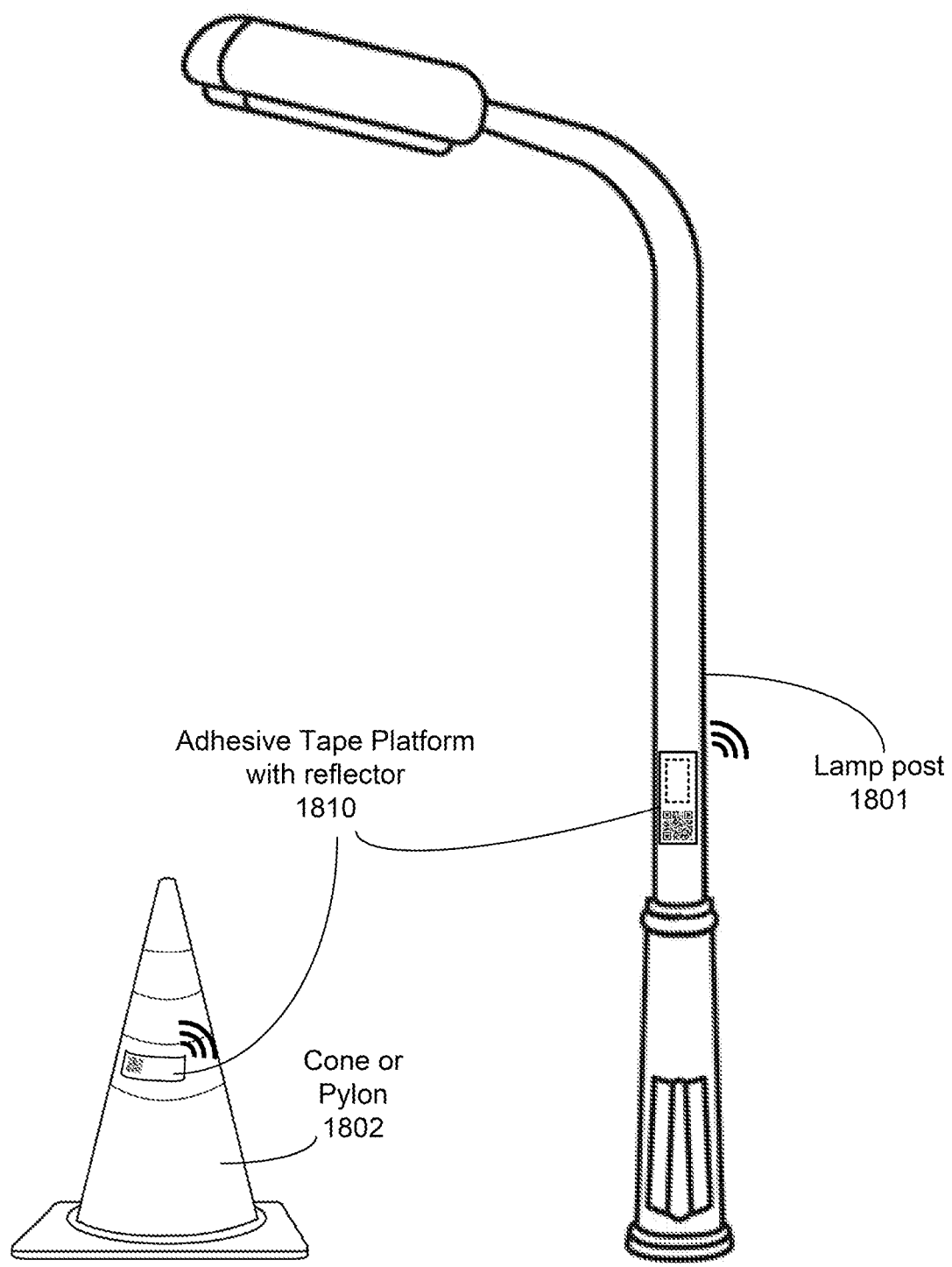
FIG. 18 shows examples of an adhesive tape platform with a reflector attached to objects in an environment, according to some embodiments.

The second tape node is then operated 1720, according to the local master node role, and the first tape node is operated 1720, according to the local secondary role Example Adhesive Tape Platform Nodes for Use in Border Security and Other Environments FIG. 18 shows examples of an adhesive tape platform 1810 with a reflector attached to objects in an environment, according to some embodiments. FIGS. 19A-19D are example diagrams showing the adhesive tape platform with the reflector 1901, according to some embodiments. The adhesive tape platform with the reflector 1901, 1902 are embodiments of the adhesive tape platform 1810, which itself is an embodiment of the adhesive tape platform discussed with respect to FIGS. 1-6C. The adhesive tape platform 1810 includes a reflector, which allow the adhesive tape platform to serve dual functions as a wireless communication and sensor device and as a reflective safety tape. The reflector is a tape, film, or other component that is highly reflective for light in the visible spectrum, according to some embodiments. The reflector may also be highly reflective in portions of the light spectrum outside of the visible spectrum. The adhesive tape platform may 1810 may be placed in security or checkpoint environments, such as ports or border control checkpoints, according to some embodiments.

Figure 19A:
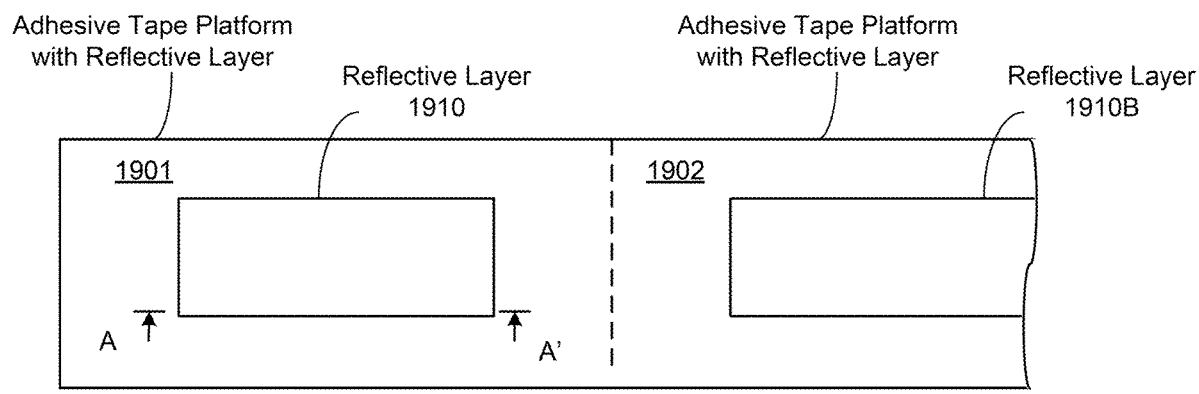
FIGS. 19A-19D are example diagrams showing the adhesive tape platform with the reflector, according to some embodiments.
Figure 19B:
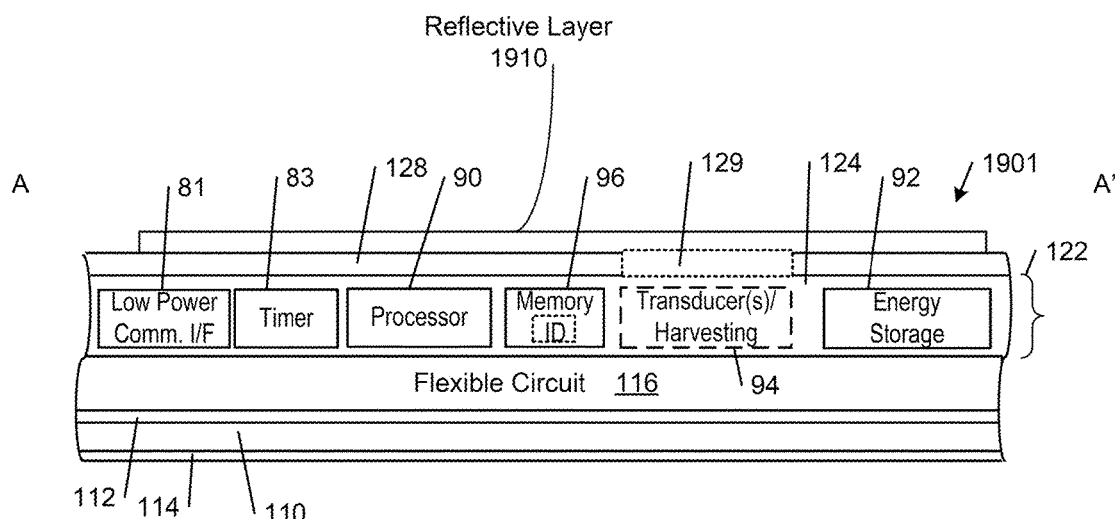

FIG. 19A shows a top-down perspective of a portion of a length of the adhesive tape platform, including the node 1901. FIG. 19B shows a cross-section of the adhesive tape platform 1901 along the line A-A'.

Figure 19C:
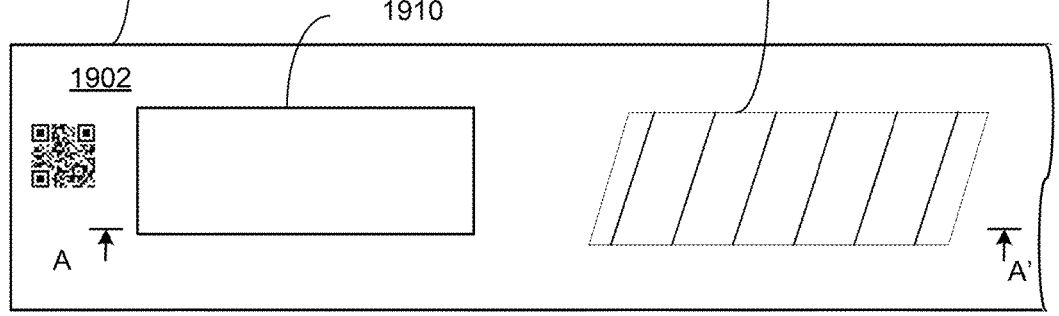
Figure 19D:
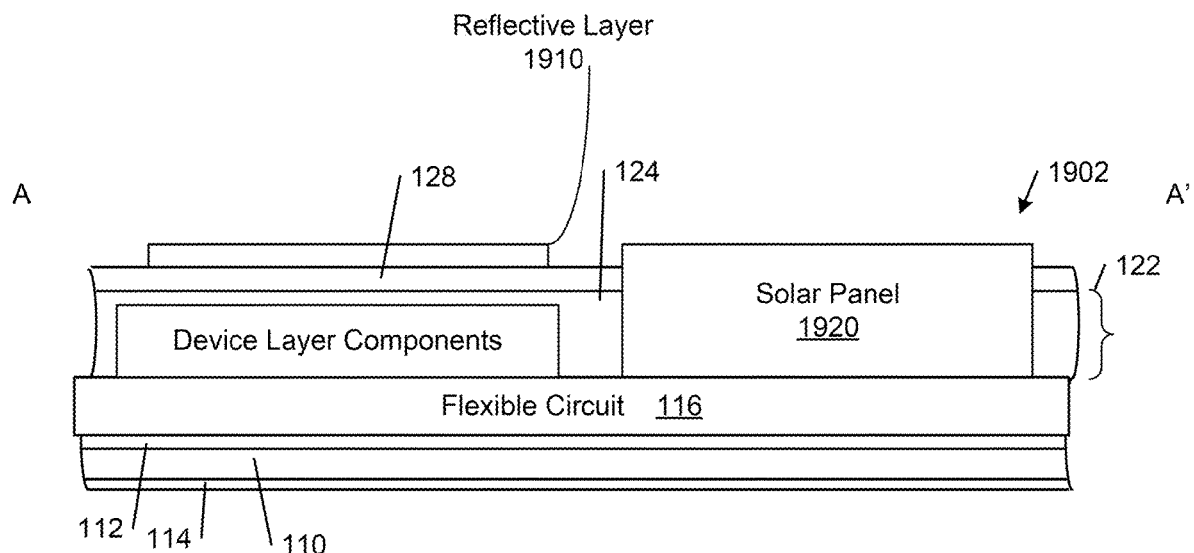

FIG. 19C shows a top-down perspective of an adhesive tape platform node 1902 that includes both a reflector and solar panel for harvesting energy and recharging a battery of the adhesive tape platform 1902, according to some embodiments. FIG. 19D shows a cross-section of the adhesive tape platform 1902 along the line A-A'.

Figure 20A:
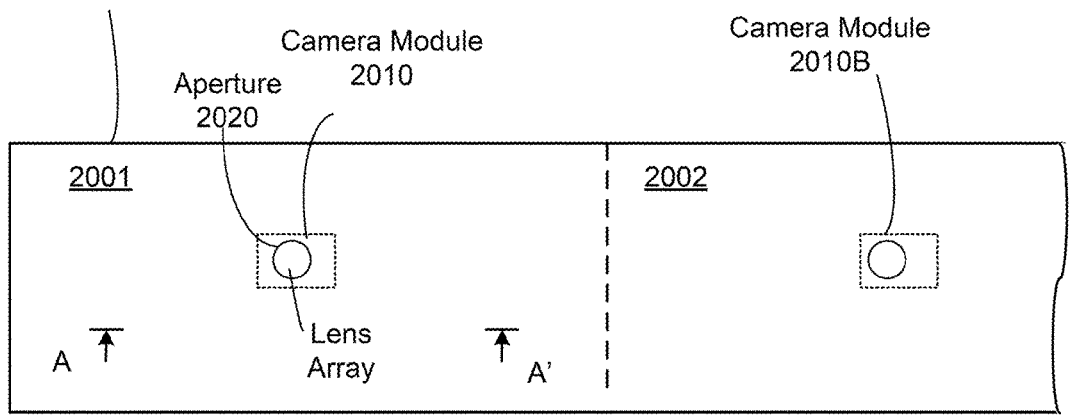
FIG. 20A-20B are example diagrams showing a camera node, according to some embodiments.
Figure 20B:
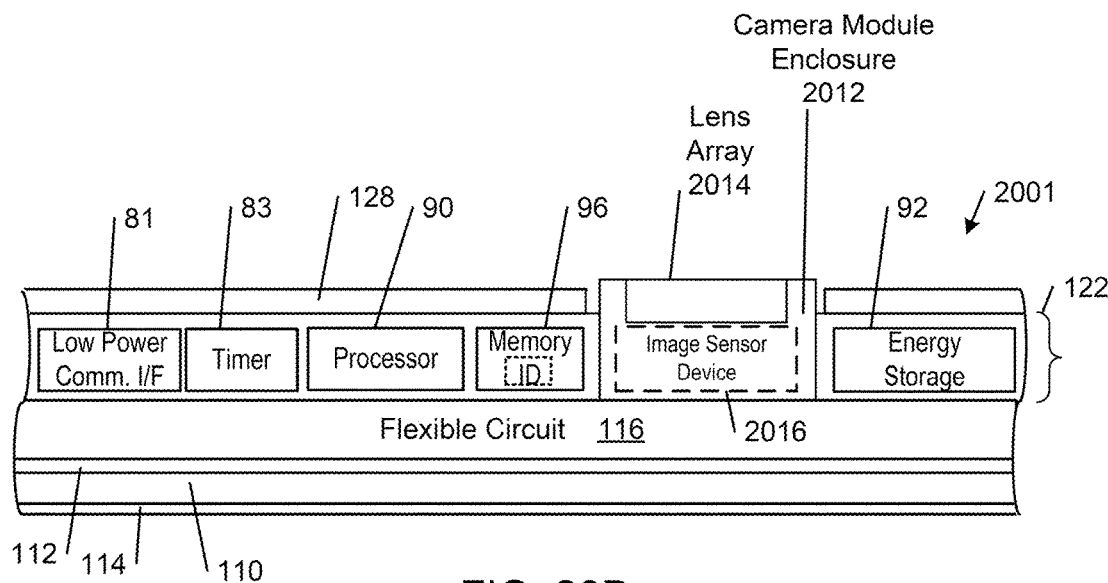

FIG. 20A-20B are example diagrams showing a camera node 2001, according to some embodiments. FIG. 20B shows a cross-section of the camera node 2001, along the line A-A'. The camera node 2001 is an embodiment of an adhesive tape platform node that includes an integrated camera module 2010. The camera module 2010 includes a lens array that is exposed to light via an aperture 2020 in the substrate or cover layer of the camera node. The lens array may comprise a single lens, in some embodiments, or multiple lenses in an array, according to other embodiments.

Computer Apparatus

Figure 21:
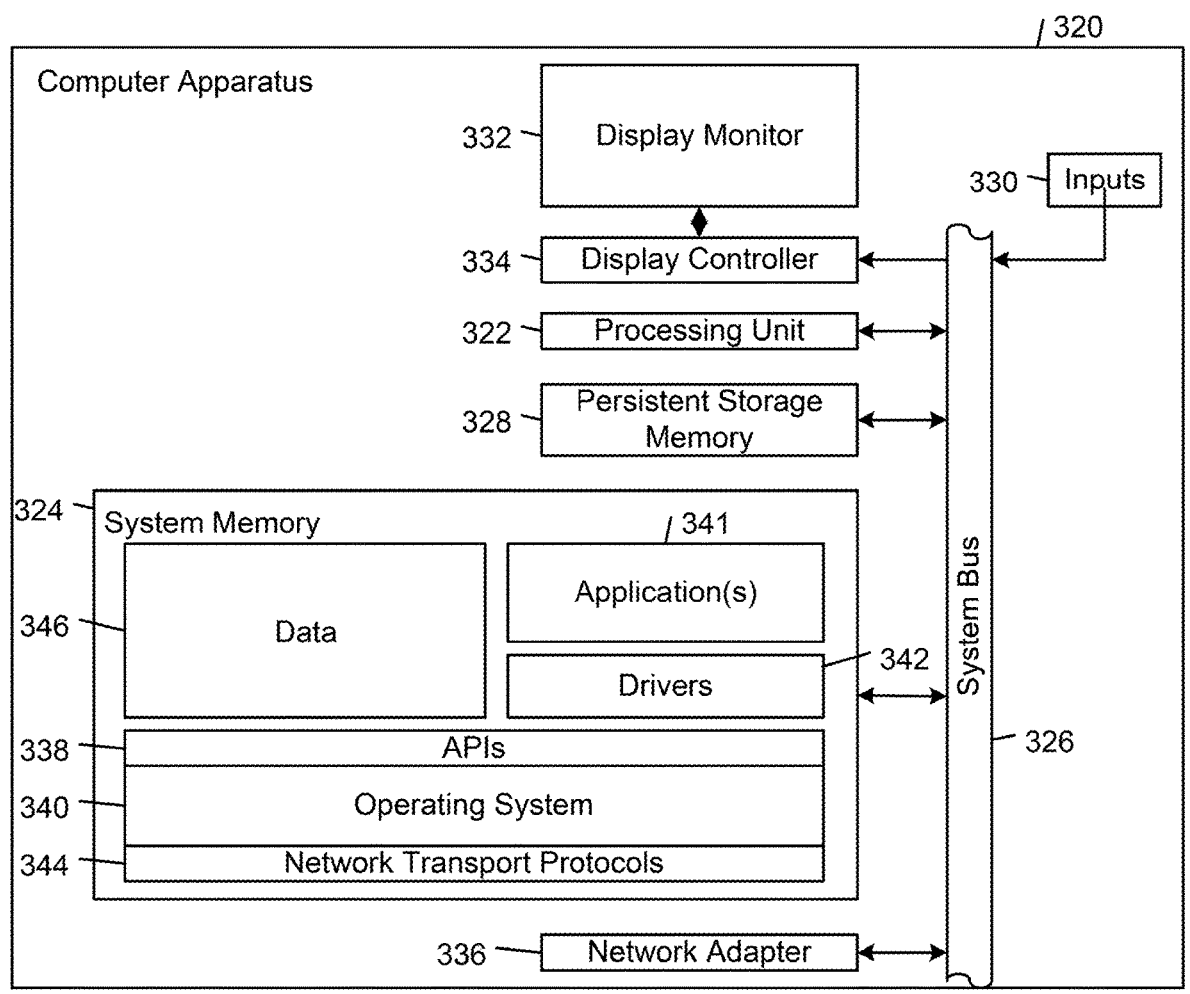
FIG. 21 shows an example embodiment of computer apparatus, according to some embodiments.

FIG. 21 shows an example embodiment of computer apparatus 320 that, either alone or in combination with one or more other computing apparatus, is operable to implement one or more of the computer systems described in this specification.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Washington U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
    wirelessly communicating, by a first scanning tape node attached to a lifting apparatus of a crane, with a tamper detecting tape node on a container while the crane is moving the container, wherein the wireless communication between the scanning tape node and the tamper detecting tape node is performed using a first type of wireless communication system;
    receiving, by the first scanning tape node, identifier data from the tamper detecting tape node, the identifier data comprising one or more identifiers of the tamper detecting tape node;
    receiving, by the first scanning tape node, tampering event data from the tamper detecting tape node, the tampering event data corresponding to tampering events that have been detected by the tamper detecting tape node or a lack of detected tampering events detected by the tamper detecting tape node;
    transmitting, by the first scanning tape node, location data corresponding to a location where the container has been moved to by the crane, the received identifier data, and the received tampering event data to a wireless node of an associated tracking using a second type of wireless communication system, wherein the tracking system logs the received identifier data, the location, and the received tampering event data in a database.

2. The method of claim 1, wherein the second type of wireless communication system is different from the first type of wireless communication system.

3. The method of claim 1, wherein the second type of wireless communication system comprises one or more of a LoRa (Long Range) communication system and a LoRaWAN communication system.

4. The method of claim 1, wherein the first type of wireless communication system comprises a Bluetooth-based or Bluetooth Low Energy (BLE)-based communication system.

5. The method of claim 1, wherein the wireless node of the tracking system comprises a gateway node configured to bridge communications between the scanning tape node and other nodes of the tracking system.

6. The method of claim 5, wherein the gateway node is located on an a portion of the crane.

7. The method of claim 1, further comprising:
responsive to the received tampering event data indicating that tampering has occurred to the container, transmitting, by the scanning tape node, an alert to a wireless node of the associated tracking system.

8. The method of claim 7, further comprising:
responsive to receiving the alert at the wireless node, instructing a user to perform an inspection of the container.

9. The method of claim 7, further comprising, wherein the wireless node receiving the alert is a client device associated with an operator of the crane.

10. The method of claim 9, wherein the alert includes instructions for the operator of the crane to move the container to a designated location for inspection.

11. The method of claim 1, wherein the tampering event data indicates that tampering has occurred to the container and further comprising:
sending, by the tracking system, one or more identifiers associated with the tamper detecting tape node and the location of the container to a client device associated with a user; and
issuing, by the tracking system, instructions for the user to inspect the container,
wherein the client device is operable to communicate with the tamper detecting tape node when the client device is within a communication range of the tamper detecting tape node to receive data from the tamper detecting tape node and confirm the identifier of the tamper detecting tape node matches one or more identifiers received from the tracking system.

12. The method of claim 11, further comprising:
guiding, by the tracking system, the user to the location of the container using a map user interface of an app on the client device.

13. The method of claim 1, further comprising:
capturing, by the scanning tape node, a video or photograph of a portion of the container where a container identifier is displayed using a camera module of the scanning tape node;
detecting the container identifier in the video or photograph;
storing the container identifier in a memory or storage of the scanning tape node;
associating the container identifier with one or more identifiers of the received identifier data;
transmitting the container identifier and the association between the one or more identifiers and the container identifier to a node of the associated tracking system, wherein the associated tracking system logs the detected container identifier and the association in the database.

14. The method of claim 13, wherein the container identifier comprises alphanumeric text displayed on one or more portions of the container.

15. A system comprising:
one or more tamper detecting tape nodes attached to a container storing one or more assets, each of the one or more tamper detecting tape nodes comprising a first type of wireless communication system and configured to detect tampering events that occur to the container, store tampering event data corresponding to the tampering events in a storage or memory of the tamper detecting tape node, and wireless communicate with other wireless nodes of the system;
one or more scanning tape nodes attached to a lifting apparatus configured to move the container, each of the one or more scanning tape nodes comprising:
the first type of wireless communication system having a first wireless communication range, and
a second type of wireless communication system having a second wireless communication range greater than the first wireless communication range,
wherein each of the one or more scanning tape nodes is configured to:
communicate with the one or more tamper detecting tape nodes when the lifting apparatus is within a first range of the container, the first range corresponding to the first wireless communication range;
a the tracking system controller configured to receive data from the one or more scanning tape nodes, track the container and the one or more assets, and maintain a database comprising data on the container and the one or more assets,
wherein the one or more scanning tape nodes are configured to receive tampering event data and identifier data from the one or more tamper detecting tape nodes, and a first scanning tape node of the one or more scanning tape nodes is configured to transmit the received tampering event data and the identifier data to the tracking system controller-using the second type of wireless communication system.

16. The system of claim 15, further comprising a camera node attached to the lifting apparatus and comprising the first type of wireless communication system and an integrated camera module, wherein the camera node is configured to capture a photograph or video of a portion of the container displaying a container identifier.

17. The system of claim 16, wherein the camera node transmits the captured photograph or video to the first scanning tape node.

18. The system of claim 16, wherein,
based on the captured photograph or video, the container identifier is detected by one or more of the camera node, the first scanning tape node, and the tracking system controller,
the tracking system controller stores an association between one or more identifiers associated with the one or more tamper detecting tape nodes and the container identifier.

19. A method comprising:
assigning, a local master node role, to a first tape node of a plurality of tape nodes;
assigning, a local secondary node role to other tape nodes of the plurality of tape nodes;
operating the first tape node, according to the local master node role;
responsive to the first tape node having a battery level lower than or equal to a first threshold level, reassigning a local secondary node role to the first tape node; and responsive to a second tape node of the first plurality of tape nodes having a highest battery level among the plurality of tape nodes, reassigning the local master node role to the second tape node, wherein afterwards, the first tape node operates according to the local master node role, and the second tape node operates according to the secondary node role.

20. The method of claim 19, further comprising:

responsive to the second tape node having a battery level lower than a second threshold level, reassigning a local secondary node role to the second tape node; and responsive to a third tape node having a battery a highest battery level among the plurality of tape nodes, reassigning the local master node role to the third tape node.

21. The method of claim 20, wherein each of the plurality of tape nodes are installed in a location that is within a first wireless communication range of each of the other tape nodes in the plurality of tape nodes.

* * * * *